United States Patent
Scott et al.

(10) Patent No.: US 11,846,979 B1
(45) Date of Patent: Dec. 19, 2023

(54) ANOMALY DETECTION AND DIAGNOSTICS BASED ON MULTIVARIATE ANALYSIS

(71) Applicant: SAS Institute Inc., Cary, NC (US)

(72) Inventors: Kevin L. Scott, Raleigh, NC (US); Deovrat Vijay Kakde, Cary, NC (US); Arin Chaudhuri, Raleigh, NC (US); Sergiy Peredriy, Raleigh, NC (US)

(73) Assignee: SAS INSTITUTE, INC., Cary, NC (US)

( * ) Notice: Subject to any disclaimer, the term of this patent is extended or adjusted under 35 U.S.C. 154(b) by 0 days.

(21) Appl. No.: 18/198,537

(22) Filed: May 17, 2023

Related U.S. Application Data

(60) Provisional application No. 63/399,832, filed on Aug. 22, 2022, provisional application No. 63/347,950, filed on Jun. 1, 2022.

(51) Int. Cl.
*G06F 17/16* (2006.01)
(52) U.S. Cl.
CPC ..................... *G06F 17/16* (2013.01)
(58) Field of Classification Search
CPC .......... G06F 17/16; G06F 17/18; G06N 5/022
See application file for complete search history.

(56) References Cited

U.S. PATENT DOCUMENTS

| | | | | |
|---|---|---|---|---|
| 6,681,187 B2 * | 1/2004 | Ishii | ....................... | G03C 1/005 700/121 |
| 6,975,953 B2 * | 12/2005 | Kadota | ................... | H01L 22/20 700/121 |
| 7,043,401 B2 * | 5/2006 | Taguchi | ................... | G06F 17/18 702/183 |
| 7,124,120 B2 * | 10/2006 | Wikiel | ................... | C25D 21/12 205/775 |
| 7,270,733 B2 * | 9/2007 | Wikiel | ................... | G01N 27/42 205/82 |
| 8,290,241 B2 * | 10/2012 | Ono | ....................... | G06T 7/0004 382/149 |

(Continued)

OTHER PUBLICATIONS

Gajjar, S., and Palazoglu, A. (2016). "A data-driven multidimensional visualization technique for process fault detection and diagnosis." *Chemometrics and Intelligent Laboratory Systems* 154:122-136.

(Continued)

*Primary Examiner* — Mohammad K Islam
(74) *Attorney, Agent, or Firm* — Kilpatrick Townsend & Stockton, LLP

(57) ABSTRACT

Anomalies in a target object can be detected and diagnosed using improved Mahalanobis-Taguchi system (MTS) techniques. For example, an anomaly detection and diagnosis (ADD) system can receive a set of measurements associated with attributes of a target object. A Mahalanobis distance (MD) can be determined using a generalized inverse matrix. An abnormal condition can be detected when the MD is greater than a predetermined threshold value. The ADD system can determine an importance score for each measurement of a corresponding attribute. The attribute whose measurement has the highest importance score can be determined to be responsible for the abnormal condition.

28 Claims, 26 Drawing Sheets

(56) References Cited

U.S. PATENT DOCUMENTS

| | | | | |
|---|---|---|---|---|
| 8,433,539 | B2* | 4/2013 | Ishioka | F03D 17/00 702/179 |
| 2003/0199781 | A1* | 10/2003 | Tsuboshita | A61B 5/369 600/544 |
| 2003/0233198 | A1* | 12/2003 | Taguchi | G06F 17/18 702/182 |
| 2004/0077966 | A1* | 4/2004 | Yamaguchi | A61B 5/369 600/544 |
| 2004/0215424 | A1* | 10/2004 | Taguchi | G06F 17/18 702/189 |
| 2020/0285531 | A1* | 9/2020 | Hiroe | G06F 17/16 |
| 2022/0083818 | A1* | 3/2022 | Nozoe | G06F 18/22 |

OTHER PUBLICATIONS

Sapountzoglou, N., Lago, J., and Raison, B. (2020). "Fault diagnosis in low voltage smart distribution grids using gradient boosting trees." *Electric Power Systems Research* 182:106254.

Santos, P., et al. (2015). "An SVM-based solution for fault detection in wind turbines." *Sensors* 15:5627-5648.

Zhang, D., et al. (2018). "A data-driven design for fault detection of wind turbines using random forests and XGboost." *IEEE Access* 6:21020-21031.

Taguchi, G., and Rajesh, J. (2000). "New trends in multivariate diagnosis." *Sankhyā: The Indian Journal of Statistics, Series B*: 233-248.

Saxena, A., Goebel, K., Simon, D., and Eklund, N. (2008). "Damage Propagation Modeling for Aircraft Engine Runto-Failure Simulation." *In Proceedings of the International Conference on Prognostics and Health Management*, 1-9. Piscataway, NJ: IEEE.

Downs, J. J., and Vogel, E. F. (1993). "A plant-wide industrial process control problem." *Computers and Chemical Engineering* 17:245-255.

McLachlan, G. J. (1999). "Mahalanobis distance." *Resonance* 4:20-26.

Xiao, et al., Optimized Mahalanobis-Taguchi System for High-Dimensional Small Sample Data Classification. Research Article—Open Access, vol. 2020, Article ID 4609423, Published Apr. 26, 2020, pp. 1-31.

SAS The Power to Know—Knowledge Sharing Application—Global Professional Services Division, "Mahalanobis-Taguchi Method Macros", Jun. 28, 2022, 1 page.

Chang Z. et al., "Multiple Attribute Decision Making Method With Intervals Based on Mahalanobis-Taguchi System and TOPSIS Method", Systems Engineering—Theory & Practice, vol. 34, Mo. 1, Jan. 2014, 8 pages.

Git Hub—Okayaa/MTSYS, Methods in Mahalanbis-Taguchi (MT) System, 3 pages.

Git Hub—NicoleRadiziwill / easyMTS, Taguchi, Chowdhury & Wu (2005), Taguchi's Quality Engineering Handbook, 5 pages.

Dura Systems Corporation "Monitoring of Equipment Operation and Analysis of Device Data", Copyright 2019, 2 pages.

Xiao et al., EBSCO "Optimized Mahalanobis-Taguchi System For High-Dimensional Small Sample Data Classification", 2 pages.

Tao J. et al., "Application of Ridge Mahalanobis-Taguchi System Based on Ridge Estimation in Data With Multicollinearity", Mathematics in Practice and Theory, vol. 46, No. 4, Feb. 2016, 8 pages.

AngleTry Associates "Explainable AI Using Correlation", MT System (Mahalanobis-Taguchi System), 6 pages.

Abraham, B. & Variyath, A.M., Discussion—Technometrics, Feb. 2003, vol. 45, No. 1, 4 pages.

Han Y. et al., "Multicollinearity Analysis of Mahalanobis-Taguchi system Method in Multidimensional System Optimization", Industrial Engineering Journal, vol. 15, No. 2, Apr. 2012, 7 pages.

* cited by examiner

| UID | Product_ID | Air_temperature | Process_temperature | Rotational_speed | Torque | Heat_dissipation_failure |
|---|---|---|---|---|---|---|
| 1 | M14860 | 298.1 | 308.6 | 1551 | 42.8 | 0 |
| 2 | L47181 | 298.2 | 308.7 | 1408 | 46.3 | 0 |
| 3 | L47182 | 298.1 | 308.5 | 1498 | 49.4 | 0 |
| 4 | L47183 | 298.2 | 308.6 | 1433 | 39.5 | 0 |
| 5 | L47184 | 298.2 | 308.7 | 1408 | 40 | 0 |
| 6 | M14865 | 298.1 | 308.6 | 1425 | 41.9 | 0 |
| 7 | L47186 | 298.1 | 308.6 | 1558 | 42.4 | 0 |
| 8 | L47187 | 298.1 | 308.6 | 1527 | 40.2 | 0 |
| 9 | M14868 | 298.3 | 308.7 | 1667 | 28.6 | 0 |
| 10 | M14869 | 298.5 | 309 | 1741 | 28 | 0 |
| 11 | H29424 | 298.4 | 308.9 | 1782 | 23.9 | 0 |
| 12 | H29425 | 298.6 | 309.1 | 1423 | 44.3 | 0 |
| 13 | M14872 | 298.6 | 309.1 | 1339 | 51.1 | 0 |
| 14 | M14873 | 298.6 | 309.2 | 1742 | 30 | 0 |
| 15 | L47194 | 298.6 | 309.2 | 2035 | 19.6 | 0 |

1702 — UID
1704 — Product_ID
1706 — Air_temperature
1708 — Process_temperature
1710 — Rotational_speed
1712 — Torque
1717 — Heat_dissipation_failure
1700

FIG. 17

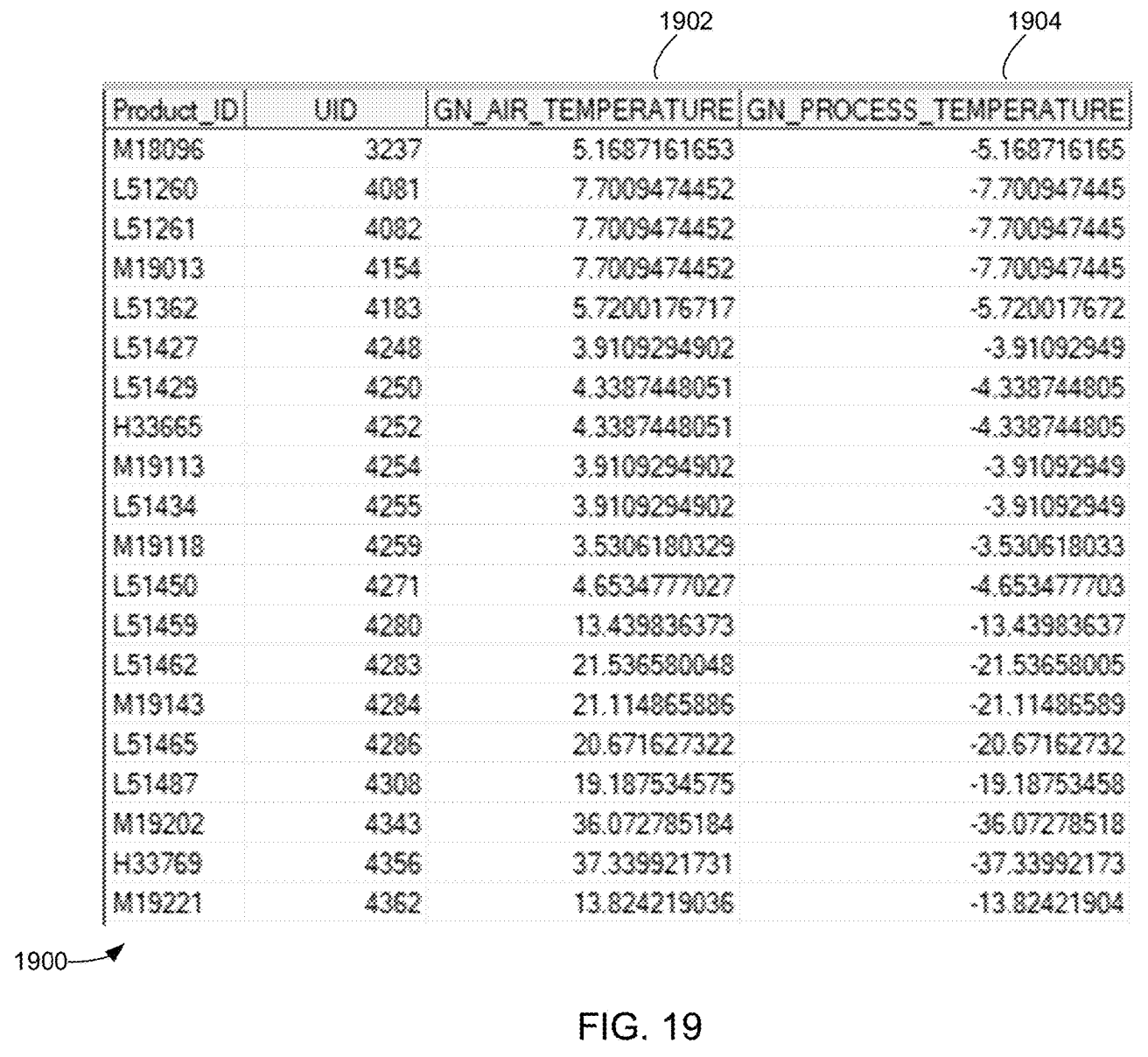

| Product_ID | UID | GN_AIR_TEMPERATURE | GN_PROCESS_TEMPERATURE |
|---|---|---|---|
| M18086 | 3237 | 5.168716165 | -5.168716165 |
| L51260 | 4081 | 7.709474452 | -7.709474445 |
| L51261 | 4082 | 7.709474452 | -7.709474445 |
| M19013 | 4154 | 7.709474452 | -7.709474445 |
| L51362 | 4183 | 5.720176717 | -5.720176172 |
| L51427 | 4249 | 3.910294902 | -3.910929349 |
| L51429 | 4250 | 4.338744051 | -4.338744805 |
| H33665 | 4252 | 4.338744051 | -4.338744805 |
| M19113 | 4254 | 3.910294902 | -3.910929349 |
| L51434 | 4255 | 3.910294902 | -3.910929349 |
| M19118 | 4259 | 3.530618033 | -3.530618033 |
| L51450 | 4271 | 4.653477027 | -4.653477703 |
| L51459 | 4280 | 13.43983637 | -13.43983637 |
| L51462 | 4283 | 21.53658005 | -21.53658005 |
| M19143 | 4284 | 21.11486586 | -21.11486589 |
| L51465 | 4286 | 20.67182732 | -20.67182732 |
| L51487 | 4308 | 19.18753458 | -19.18753458 |
| M19202 | 4343 | 36.07278518 | -36.07278518 |
| H33769 | 4356 | 37.33992173 | -37.33992173 |
| M19221 | 4362 | 13.82421904 | -13.82421904 |

FIG. 19

| | Standing_Long_Jump | Vertical_Jump | student_id |
|---|---|---|---|
| 1 | 193.92503074 | 23.682982767 | 4351 |
| 2 | 163.71320469 | 21.319838602 | 4352 |
| 3 | 172.950587 | 19.367203079 | 4353 |
| 4 | 168.23091528 | 18.128543309 | 4354 |
| 5 | 182.52437497 | 22.49143781 | 4355 |
| 6 | 187.37606255 | 22.435544019 | 4356 |
| 7 | 162.00864329 | 21.22621385 | 4357 |
| 8 | 186.29948618 | 23.773342775 | 4358 |
| 9 | 187.15546733 | 24.364909871 | 4359 |
| 10 | 182.75170099 | 20.807553635 | 4360 |
| 11 | 183.73981831 | 23.130245619 | 4361 |
| 12 | 160.56122436 | 20.311652192 | 4362 |
| 13 | 193.53064453 | 23.999496309 | 4363 |
| 14 | 174.88049854 | 23.977922408 | 4364 |
| 15 | 180.45379854 | 23.09863718 | 4365 |
| 16 | 200.56217135 | 24.581319262 | 4366 |
| 17 | 178.34005846 | 20.974799454 | 4367 |
| 18 | 138.94976353 | 17.124809074 | 4368 |
| 19 | 179.24872833 | 21.661307621 | 4369 |
| 20 | 181.50932078 | 23.663607657 | 4370 |
| 21 | 160.76802303 | 20.520163438 | 4371 |
| 22 | 183.61350043 | 21.785511882 | 4372 |
| 23 | 152.4657522 | 19.756621752 | 4373 |
| 24 | 218.83641214 | 28.931505387 | 4374 |
| 25 | 177.53332887 | 18.962891714 | 4375 |
| 26 | 170.19811527 | 22.165531043 | 4376 |
| 27 | 199.55697736 | 26.279080699 | 4377 |
| 28 | 190.46791249 | 24.689092795 | 4378 |
| 29 | 173.02180699 | 20.547748156 | 4379 |
| 30 | 173.00034149 | 20.412589737 | 4380 |
| 31 | 174.31959222 | 20.496695556 | 4381 |
| 32 | 162.6115654 | 21.426665232 | 4382 |

FIG. 20

| student_id | CLUSTER | min_mahalanobis_distance | bivariate_normal_cdf | GN_STANDING_LONG_JUMP | GN_VERTICAL_JUMP | Standing_Long_Jump | Vertical_Jump |
|---|---|---|---|---|---|---|---|
| 4374 | 1 | 7.3174365562 | 0.9986770798 | -0.0792631635 | 0.0792316949 | 218.9284411214 | 28.9315093970 |
| 4477 | 1 | 3.9450449638 | 0.9540032571 | 3.4318485803 | -3.4318485803 | 209.5213535293 | 25.7078011187 |
| 4513 | 1 | 3.6396188555 | 0.9695451653 | -1.9268150508 | 1.9268150508 | 202.3433594 | 27.2297616114 |
| 4519 | 1 | 2.3596540204 | 0.9758813631 | 0.5571074436 | -0.5571074436 | 206.3684849264 | 26.5917938168 |
| 4526 | 1 | 4.4549727415 | 0.9808690091 | 0.9342232739 | -0.9342232739 | 207.7840936939 | 27.6871690909 |
| 4600 | 1 | 5.6220705339 | 0.9842711834 | 2.9651439361 | -2.9651439361 | 216.0206009922 | 26.6358922599 |
| 4624 | 2 | 3.6152975364 | 0.9883759511 | 5.8931241201 | -5.8931241201 | 148.1527295 | 15.8417223815 |
| 4706 | 2 | 4.4442239989 | 0.9703170358 | 7.0893941704 | -7.0893941704 | 149.6236431381 | 15.7283943413 |
| 4751 | 2 | 4.2057377006 | 0.9345099521 | -4.9736682247 | 4.9736682225 | 140.4312659625 | 17.8563522000 |
| 4756 | 2 | 3.6189931911 | 0.9664090555 | 0.1379689894 | -0.1379689894 | 149.1358149805 | 17.4480669025 |
| 4779 | 2 | 5.0035042572 | 0.9887447597 | -7.7227099936 | 7.7227099936 | 137.0986091193 | 17.9857664003 |

| occupancy_dt | comp_read_2 | comp_read_4 | comp_read_8 | comp_read_9 | comp_read_12 | comp_read_13 | comp_read_14 | min_mahalanobis_distance | outlier_indicator |
|---|---|---|---|---|---|---|---|---|---|
| 02JUL2021 | -193.4633116 | 51.49064061 | -72.50300061 | -140.5126984 | -680.3809897 | -154.1039264 | -1.13637E-13 | 3.660272253 | 1 |
| 15OCT2021 | -35.67710298 | 48.04691774 | -74.62248837 | 4.44444444 | -269.8486845 | -47.3975918 | 123.7822375 | 3.340014456 | 1 |
| 19OCT2021 | -44.11150183 | -20.26980283 | 31.92074242 | 103.5844444 | 1060.019793 | -90.4755713 | 153 | 6.594080953 | 1 |
| 23OCT2021 | 315.9572013 | 599.2878090 | 57.43477407 | 0 | 980.7297206 | 457.9108647 | 405.4154166 | 18.76377975 | 1 |
| 28NOV2021 | -343.2222222 | 15.55542018 | -12.18045809 | 38.73781904 | -135.170560 | -3.22763928 | -306.89 | 5.315223973 | 1 |
| 29NOV2021 | 377.2854866 | 433.7200952 | 37.37054327 | 28.65117847 | 6.654861904 | -0.78612276 | 348.8220333 | 9.497770805 | 1 |
| 30NOV2021 | 366.59 | 0 | 13.94104685 | 65.38267507 | -5.40902018 | -98.6027133 | 331.044 | 4.970499552 | 1 |
| 01DEC2021 | 443.7061980 | 0 | 58.46390685 | 103.6319444 | 364.2956211 | -14.65954837 | 418.8168703 | 5.646089849 | 1 |
| 02DEC2021 | 367.0420255 | 296.0663772 | 189.8309364 | 260.0803333 | 313.5665469 | 225.0153692 | 354.5649108 | 4.58516709 | 1 |
| 05JAN2022 | 510.5727633 | 354.8210404 | 335.9018444 | 477.0580333 | 13.82988036 | 406.3165171 | 486.0248441 | 12.249697946 | 1 |
| 06JAN2022 | 441.3250185 | 317.9162558 | 249.7592857 | 437.5625 | 11.94615325 | 310.1509605 | 379.0427429 | 9.292171198 | 1 |
| 11JAN2022 | -59.02040243 | -133.8184394 | -66.45191423 | -102.21075 | -8.50721541 | -134.2160753 | -228.1318372 | 3.940307691 | 1 |
| 18JAN2022 | 58.77519141 | 124.4846515 | -37.41729302 | -32.59937 | 21.73708649 | -42.96721672 | -118.9610886 | 3.164220483 | 1 |
| 20JAN2022 | 26.27802527 | -91.60392454 | -6.04030036 | -54.98921212 | -13.90252659 | 55.50560597 | 203.4604152 | 3.731019234 | 1 |

ANOMALY DETECTION AND DIAGNOSTICS BASED ON MULTIVARIATE ANALYSIS

REFERENCE TO RELATED APPLICATION

This claims the benefit of priority under 35 U.S.C. § 119(e) to U.S. Provisional Patent Application No. 63/399,832, filed Aug. 22, 2022, and to U.S. Provisional Patent Application No. 63/347,950, filed Jun. 1, 2022, the entirety of each of which is hereby incorporated by reference herein.

TECHNICAL FIELD

The present disclosure relates generally to anomaly detection and diagnostics. More specifically, but not by way of limitation, this disclosure relates to anomaly detection and diagnostics based on multivariate analysis.

BACKGROUND

A Mahalanobis-Taguchi System (MTS) uses multivariate data to enable detection and diagnosis of anomalous conditions in a wide variety of industrial applications, for example electric power, chemical, and aerospace. Many of these applications monitor multiple variables via sensors or other data collecting or measuring techniques. Most of the data collected from these applications suggest normal operating conditions. However, when any abnormal condition occurs, it can be reflected in the data collected from these applications.

SUMMARY

One example of the present disclosure includes a system having one or more processors and one or more memory devices including instructions that are executable by the one or more processors for causing the one or more processors to perform operations. The operations can include receiving a set of measurements associated with a target object, the set of measurements corresponding to a plurality of attributes of the target object. The operations can include determining a Mahalanobis distance for the set of measurements using a generalized inverse matrix. The Mahalanobis distance is a distance between the set of measurements and a centroid of a multidimensional space. The multidimensional space is based on the generalized inverse matrix. The operations can include generating an orthogonal array based on how many measurements are in the set of measurements. The operations can include comparing the Mahalanobis distance to a threshold value associated with an abnormal condition of the target object. The operations can include determining an attribute responsible for the abnormal condition of the target object in response to determining that the Mahalanobis distance meets or exceeds the threshold value. The operation of determining an attribute responsible for the abnormal condition of the target object can include generating transformed sets of measurements by using the orthogonal array to transform the set of measurements, wherein at least one measurement of the set of measurements is excluded from each of the transformed sets of measurements; determining transformed Mahalanobis distances for the transformed sets of measurements using the generalized inverse matrix; determining an importance score for each attribute of the plurality of attributes of the target object based on differences between (i) an average of transformed Mahalanobis distances in which measurements for the attribute are present and (ii) another average of transformed Mahalanobis distances in which measurements for the attribute are excluded; and selecting one of the plurality of attributes that corresponds to a highest importance score as the attribute responsible for the abnormal condition. The operations can also include generating a notification indicating the abnormal condition and the attribute responsible for the abnormal condition and transmitting the notification to a user device of a user associated with the target object.

Another example of the present disclosure can include a method. The method can include receiving a set of measurements associated with a target object, the set of measurements corresponding to a plurality of attributes of the target object. The method can include determining a Mahalanobis distance for the set of measurements using a generalized inverse matrix. The Mahalanobis distance is a distance between the set of measurements and a centroid of a multidimensional space. The multidimensional space is based on the generalized inverse matrix. The method can include generating an orthogonal array based on how many measurements are in the set of measurements. The method can include comparing the Mahalanobis distance to a threshold value associated with an abnormal condition of the target object. The method can include determining an attribute responsible for the abnormal condition of the target object in response to determining that the Mahalanobis distance meets or exceeds the threshold value. Determining an attribute responsible for the abnormal condition of the target object can include generating transformed sets of measurements by using the orthogonal array to transform the set of measurements, wherein at least one measurement of the set of measurements is excluded from each of the transformed sets of measurements; determining transformed Mahalanobis distances for the transformed sets of measurements using the generalized inverse matrix; determining an importance score for each attribute of the plurality of attributes of the target object based on differences between (i) an average of transformed Mahalanobis distances in which measurements for the attribute are present and (ii) another average of transformed Mahalanobis distances in which measurements for the attribute are excluded; and selecting one of the plurality of attributes that corresponds to a highest importance score as the attribute responsible for the abnormal condition. The method can also include generating a notification indicating the abnormal condition and the attribute responsible for the abnormal condition and transmitting the notification to a user device of a user associated with the target object.

Yet another example of the present disclosure can include a non-transitory computer-readable medium comprising program code that is executable by one or more processors for causing the processor to perform operations. The operations can include receiving a set of measurements associated with a target object, the set of measurements corresponding to a plurality of attributes of the target object. The operations can include determining a Mahalanobis distance for the set of measurements using a generalized inverse matrix. The Mahalanobis distance is a distance between the set of measurements and a centroid of a multidimensional space. The multidimensional space is based on the generalized inverse matrix. The operations can include generating an orthogonal array based on how many measurements are in the set of measurements. The operations can include comparing the Mahalanobis distance to a threshold value associated with an abnormal condition of the target object. The operations can include determining an attribute responsible for the abnormal condition of the target object in response to determining that the Mahalanobis distance meets or exceeds the threshold value. The operation of determining an attribute responsible for the abnormal condition of the target object can include generating transformed sets of measurements by using the orthogonal array to transform the set of measurements, wherein at least one measurement of the set of measurements is excluded from each of the transformed sets of measurements; determining transformed Mahalanobis distances for the transformed sets of measurements using the generalized inverse matrix; determining an importance score for each attribute of the plurality of attributes of the target object based on differences between (i) an average of transformed Mahalanobis distances in which measurements for the attribute are present and (ii) another average of transformed Mahalanobis distances in which measurements for the attribute are excluded; and selecting one of the plurality of attributes that corresponds to a highest importance score as the attribute responsible for the abnormal condition. The operations can also include generating a notification indicating the abnormal condition and the attribute responsible for the abnormal condition and transmitting the notification to a user device of a user associated with the target object.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 17 illustrates an example dataset associated with an industrial machine, according to some aspects.

FIG. 19 illustrates an example of the importance scores of the air temperature and the importance scores of the process temperature for detected heat dissipation faults, according to some aspects.

FIG. 20 illustrates an example of athletic measurements of leg power for 16-year-old participants, according to some aspects.

FIG. 22 illustrates an example of the importance scores of the standing long jump and the importance scores of the vertical jump, according to some aspects.

FIG. 23 illustrates an example of rate residuals for seven competitive entities during a period of time, according to some aspects.

FIG. 25 illustrates an example of outlier observations among a group of observations for the sever competitive entities during another period of time, according to some aspects.

FIG. 26 illustrates importance scores of the rate residuals for the seven competitive entities in the outlier observations in FIG. 25, according to some aspects.

Figure 1:
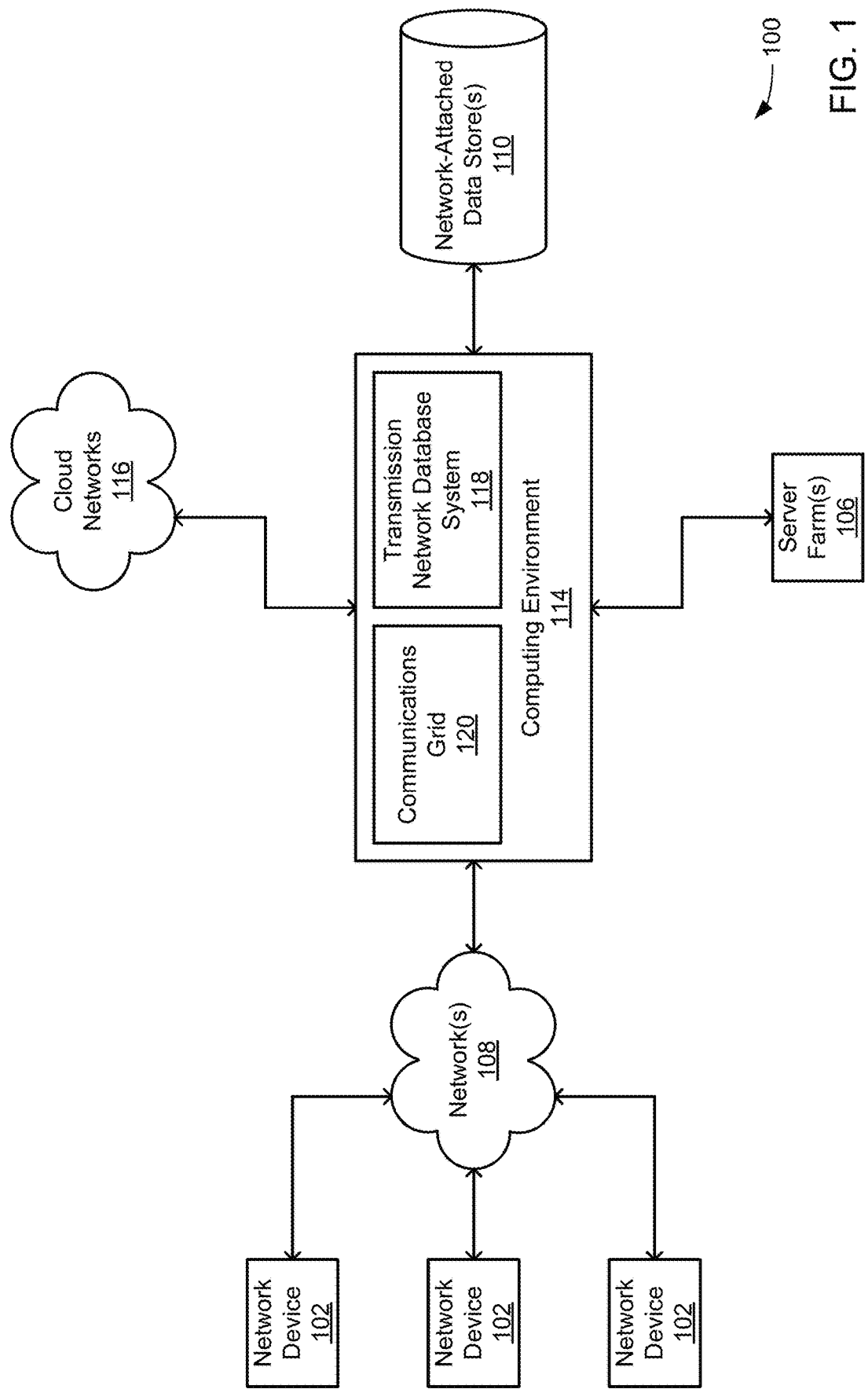
FIG. 1 is a block diagram that provides an illustration of the hardware components of a data transmission network, according to embodiments of the present technology.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A Mahalanobis-Taguchi System (MTS) can be used for anomaly detection and diagnosis in various applications involving multivariate data. But it can be challenging to accurately and timely identify which attribute is responsible for an abnormal condition from among many attributes. For example, outlier measurements in baseline data used for determining correlations between different attributes may affect the accuracy of correlation coefficients. When there are hundreds of attributes to monitor, it may take a significant amount of time to process the data related to the hundreds of attributes and may still end up misidentifying the attribute that created the abnormal condition.

Certain aspects and features of the present disclosure can solve one or more of the abovementioned problems by improving how data is processed by an anomaly detection system, to improve speed and accuracy while reducing consumption of computing resources. For example, an anomaly detection system can automatically identify and remove outlier measurements for attributes of a target object from baseline measurements. The anomaly detection system can identify and remove the outlier measurements by implementing statistical or machine learning algorithms. This can reduce the time required to determine a robust correlation relationship between the attributes. The anomaly detection system can then determine a correlation matrix based on the trimmed set of baseline measurements. The correlation matrix can be created to represent the correlation relationships between the attributes. The anomaly detection system can create a stable and accurate inverse matrix for the correlation matrix by computing a generalized inverse matrix. The generalized inverse matrix includes certain inverse properties of the correlation matrix to maintain an accuracy level while omitting other properties to improve the processing speed. The anomaly detect system can then determine a threshold related to an abnormal condition based on the generalized inverse matrix. In addition, the baseline measurements can be clustered into different clusters for accurately analyzing processes that involve different modes. Attributes can also be clustered into different groups and proxy attributes are selected to reduce data volume for processing. During implementation, the anomaly detection system can detect an abnormal condition if a set of measurements satisfies the threshold. An importance score associated with each attribute can be determined to identify an attribute that caused the abnormal condition. In this way, the anomaly detection system can more rapidly and accurately detect abnormal conditions and identify their underlying root causes, while consuming fewer computing resources (e.g., processing power and memory). The above anomaly detection system may be referred to herein as an improved MTS, since it can employ Mahalanobis-Taguchi techniques in conjunction with various enhancements to improve anomaly detection.

As a particular example, an anomaly detection and diagnosis (ADD) system can be implemented using the above techniques to facilitate anomaly detection and diagnosis. Prior to implementation, a correlation matrix can be created using baseline measurements. The baseline measurements can be obtained during normal operations. The baseline measurements can be measurements of multiple attributes of a target object taken over the course of many observations. Each observation includes measurements for corresponding attributes at one time point. Outlier measurements (e.g., from faulty observations) among the baseline measurements can be identified and removed using a robust statistical methodology (e.g., fast minimum covariance determinant (MCD) algorithm) or a machine learning algorithm (e.g., support vector data description (SVDD) algorithm) to create trimmed baseline measurements. The trimmed baseline measurements for the corresponding attributes can be processed to create correlation coefficients indicating levels of correlation between different attributes. A correlation matrix can be generated using the correlation coefficients. By removing outlier measurements from the baseline measurements, the correlation matrix is more robust for identifying outliers during implementation.

A multi-dimensional space (e.g., Mahalanobis space) can be created based on a generalized inverse matrix of the correlation matrix. A baseline set of Mahalanobis distances (MDs) can be determined for the trimmed baseline measurements. An MD is a distance between a set of measurements to the centroid of the multi-dimensional space. A threshold value for MDs in the multidimensional space can be determined based on the baseline set of MDs for detecting anomalies.

Alternatively, or additionally, the baseline measurements may be distributed into different observation clusters. Multiple multidimensional spaces can be created for corresponding measurement clusters. An MD threshold can be determined for each observation cluster. Observation clustering can enable accurate analysis of multimodal systems. For example, observations between observation clusters may not be detected as abnormal conditions when the measurements are not clustered. However, with observation clusters, some outlier measurements between the observation clusters can be detected as anomalies when the MDs of the outlier measurements are in reference to different clusters.

Alternatively, or additionally, the attributes of the target object can be grouped to multiple attribute groups. A proxy attribute can be selected from each attribute group to represent the corresponding attribute group. Correlation coefficients for the proxy attributes can be determined based on the baseline measurements of the proxy attributes. The remainder of the baseline measurements corresponding to non-proxy attributes may then be excluded in determining the correlation coefficients. Thus, the correlation matrix may only include correlation coefficients for the proxy attributes.

During implementation, the ADD system receives a set of measurements for one observation corresponding to multiple attributes associated with a target object. The target object can be a physical device (e.g., a physical machine such as a vehicle, a pump, a computer, etc.), an animal (e.g., a human or non-human animal), a body part (e.g., an organ or limb), an enterprise, or an activity. The ADD system can determine an MD for the set of measurements using the generalized inverse matrix and compare the MD to the threshold value associated with an abnormal condition of the target object. If the MD is below the threshold value, the target object is in a normal condition (e.g., operating normally). If the MD meets or exceeds the threshold value, the ADD system can determine that the target object is experiencing an abnormal condition (e.g., operating abnormally) and identify an attribute responsible for the abnormal condition.

To determine the attribute responsible for the abnormal condition, the ADD system uses an orthogonal array to transform the set of measurements, thereby generating transformed sets of measurements. The ADD system determines transformed MDs for the transformed sets of measurements using the generalized inverse matrix. The ADD system determines an importance score for each attribute of the target object based on differences between transformed MDs for transformed sets of measurements in which measurements for the attribute are present and in which measurements for the attribute are excluded. The ADD system then selects one attribute whose measurement has a highest importance score as the attribute responsible for the abnormal condition.

In some examples, the ADD system can generate a notification indicating the abnormal condition and the attribute responsible for the abnormal condition. The ADD system can then transmit the notification to a user device of a user associated with the target object. The ADD system can also automatically determine a type of the abnormal condition based on the measurement corresponding to the attribute with the highest importance score. The ADD system may include the type of the abnormal condition in the notification, for example, to help the user respond to (e.g., mitigate or resolve) the abnormal condition.

For example, several attributes associated with a truck can be measured and monitored when the truck is running. The attributes can include air pressure, engine temperature, running speed, motor speed, load, and location elevation. The measurements of these attributes are normal most of the time. Some normal measurements can be used to determine a correlation matrix for these attributes. A generalized inverse matrix for the correlation matrix can be determined to create a multidimensional space. A threshold distance to the centroid of the multidimensional space can be determined to detect abnormal conditions. When a distance for a measurement observation is greater than the threshold distance, it indicates an abnormal condition for the truck. Importance scores for different attribute measurements can be determined. The attribute whose measurement has the highest importance score can be identified to the cause of the abnormal condition. For example, the load has the highest importance score among all the monitored attributes, so the load may be the cause of the abnormal condition. An operator of the truck may receive a notification about the abnormal condition and the reason for the abnormal condition (e.g., the load is too high). The operator can then take certain actions to mitigate the abnormal condition, for example reduce the load of the truck.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-13 depict examples of systems and methods usable in connection with creating a Mahalanobis space of normal operations and detecting and diagnosing abnormal conditions, according to some aspects.

Now referring to FIG. 1, FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
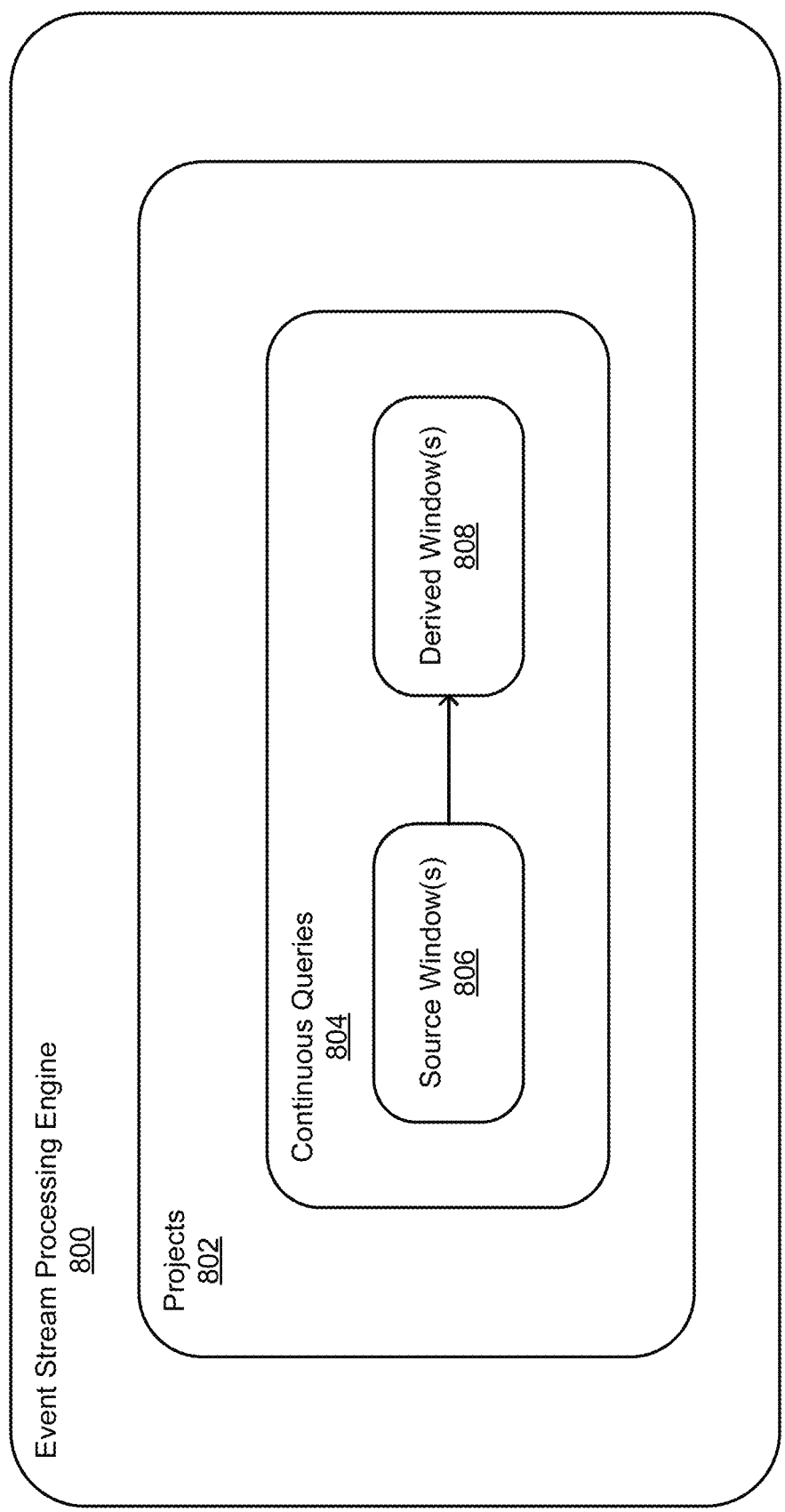
FIG. 8 illustrates a block diagram including components of an Event Stream Processing Engine (ESPE), according to embodiments of the present technology.
Figure 9:
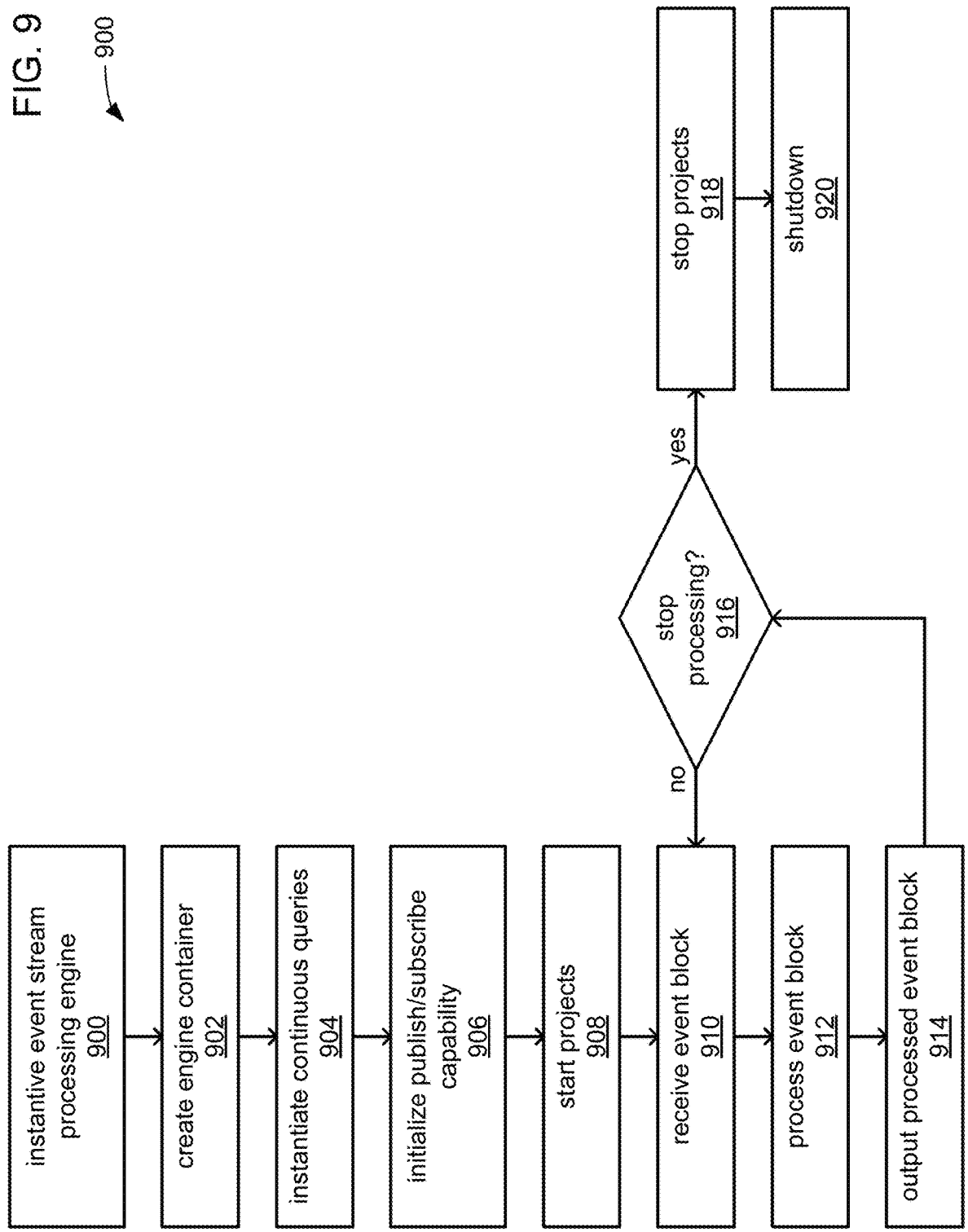
FIG. 9 illustrates a flow chart showing an example process including operations performed by an event stream processing engine, according to some embodiments of the present technology.
Figure 10:
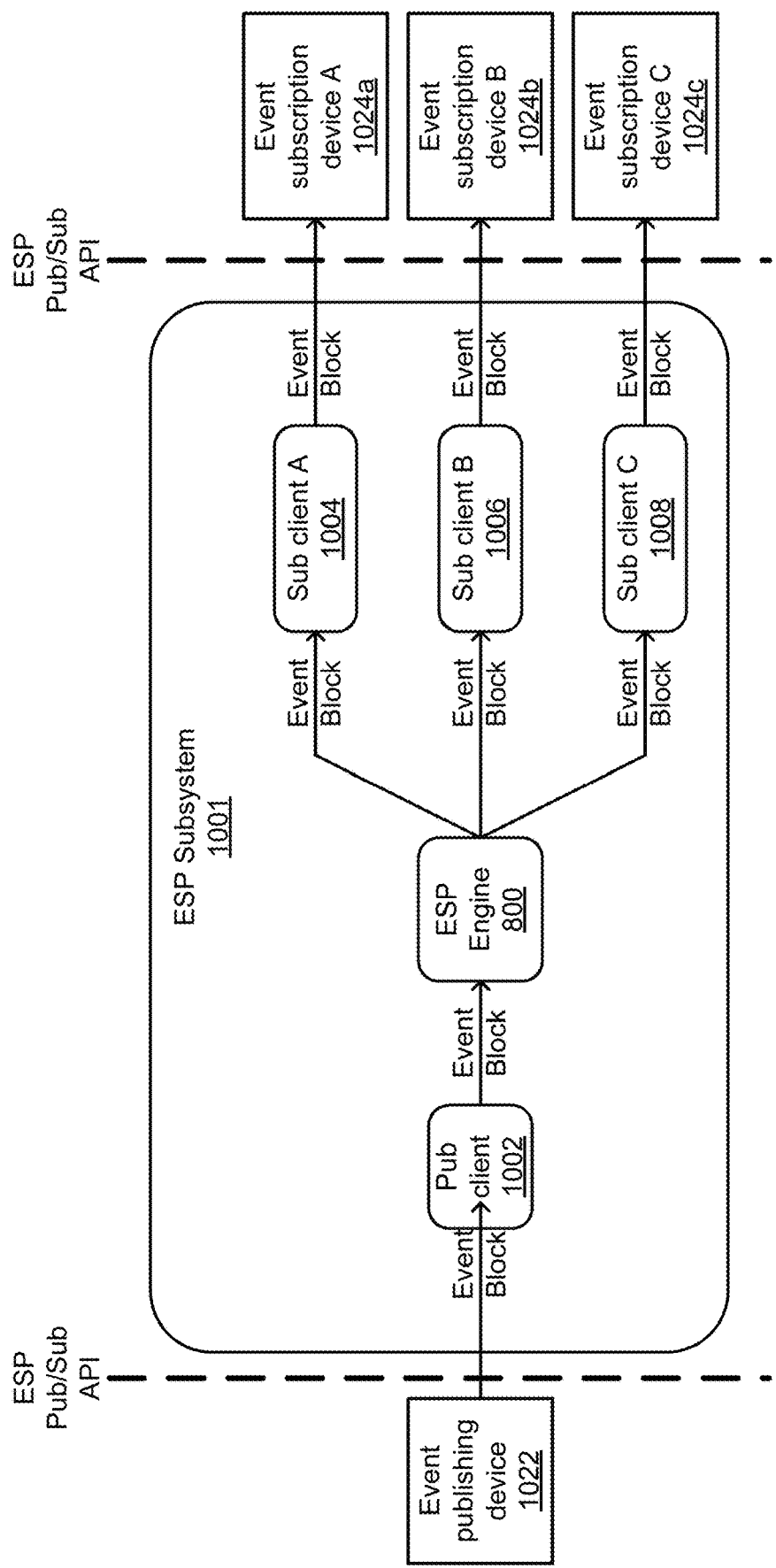
FIG. 10 illustrates an ESP system interfacing between a publishing device and event subscribing devices, according to embodiments of the present technology.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
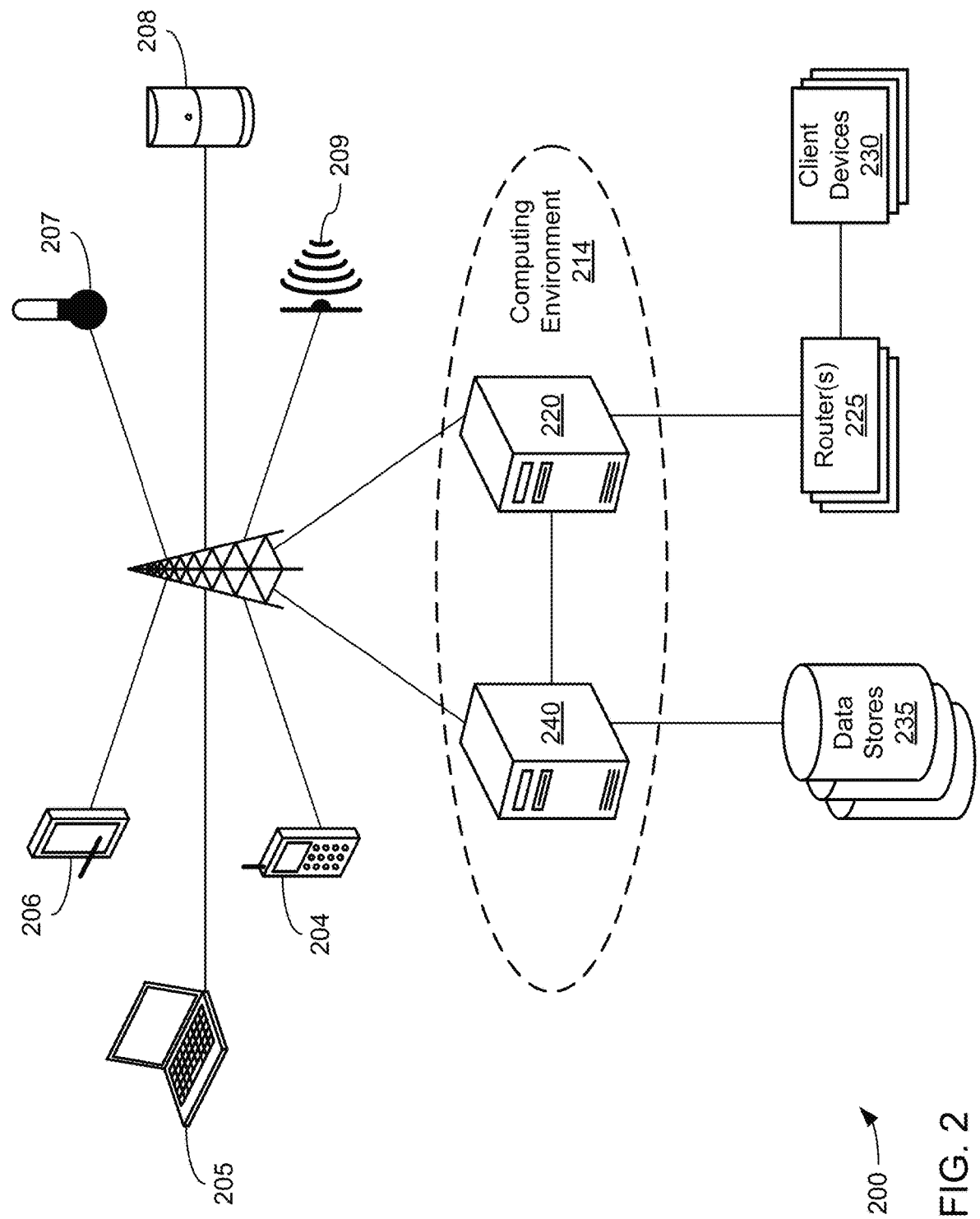
FIG. 2 illustrates an example network including an example set of devices communicating with each other over an exchange system and via a network, according to embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
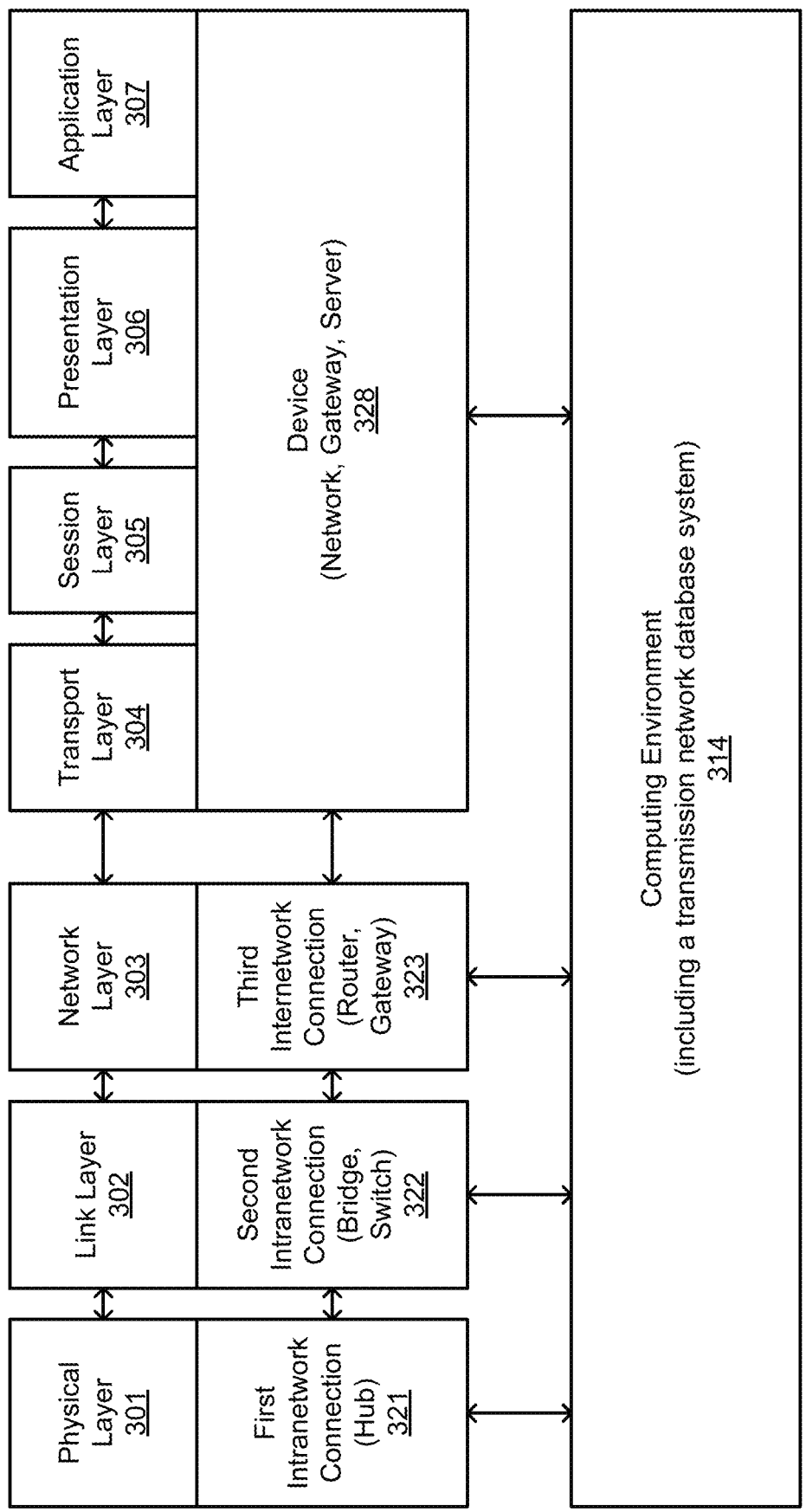
FIG. 3 illustrates a representation of a conceptual model of a communications protocol system, according to embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
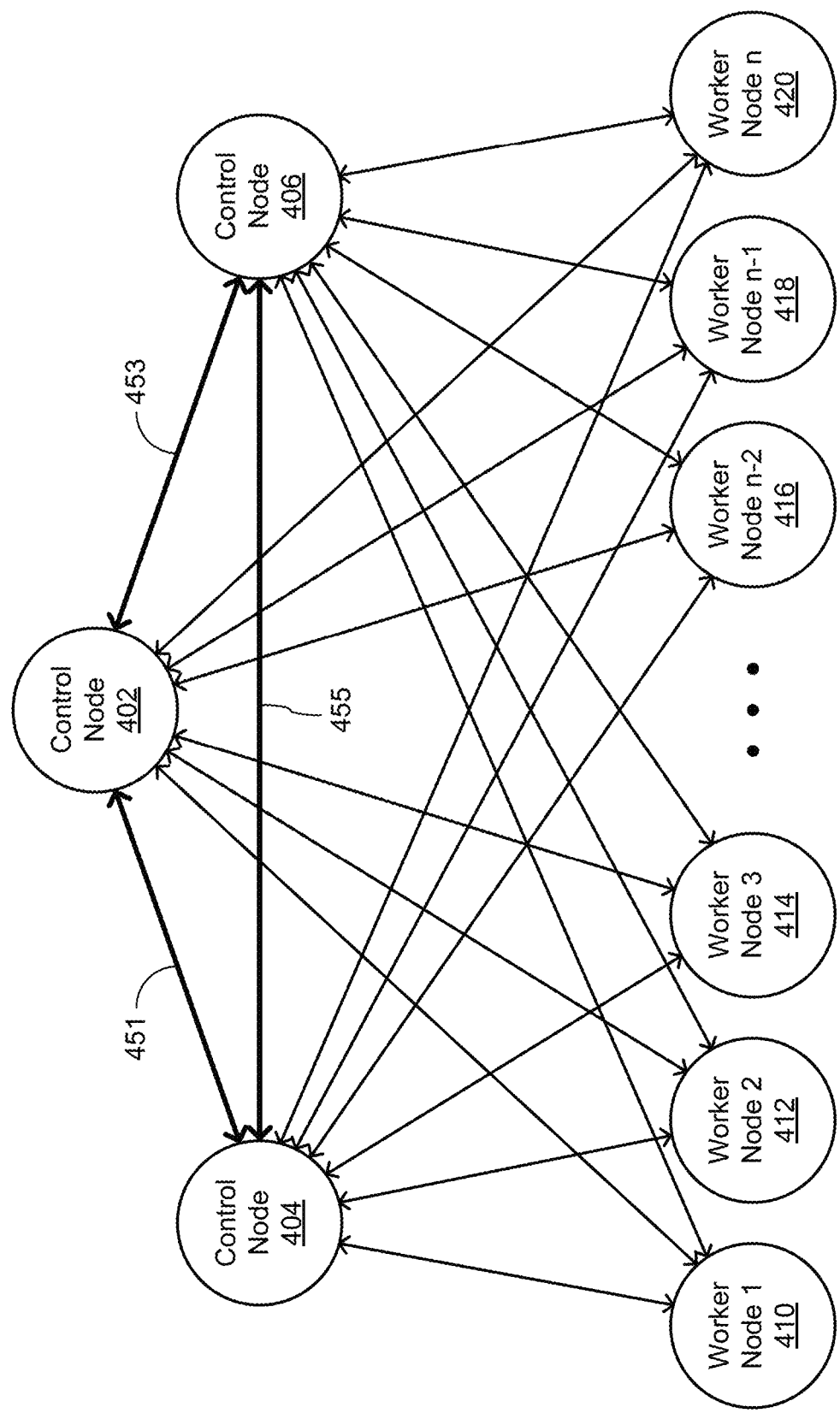
FIG. 4 illustrates a communications grid computing system including a variety of control and worker nodes, according to embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
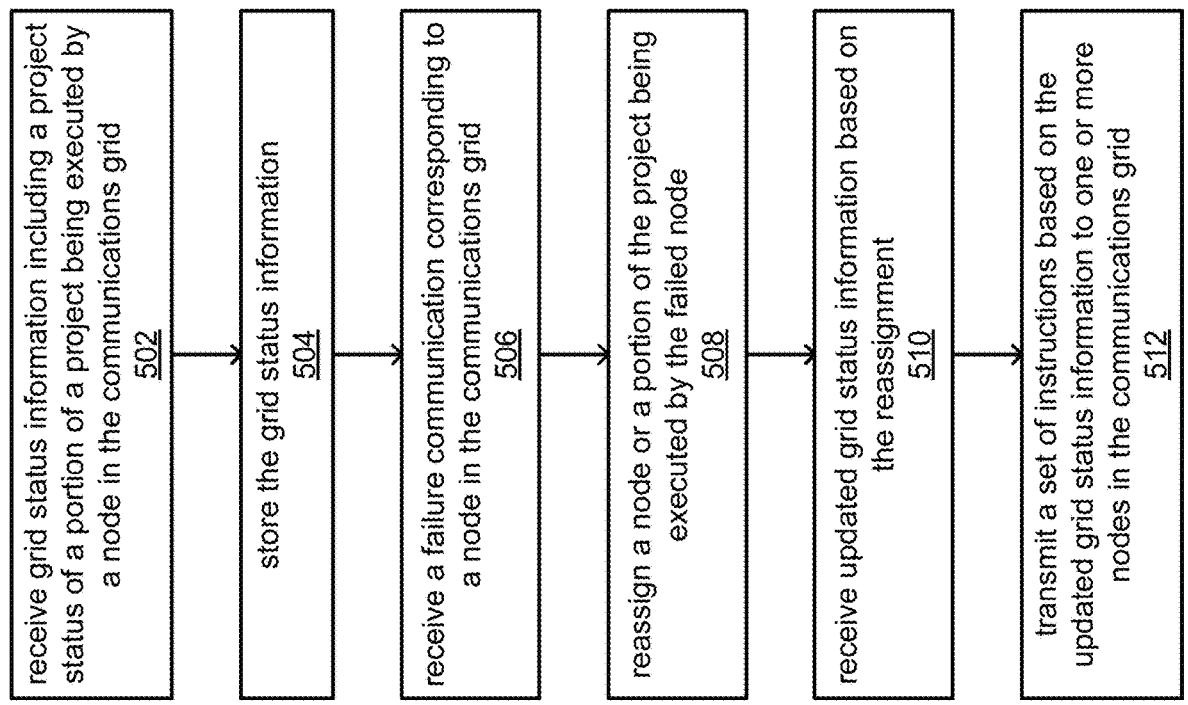
FIG. 5 illustrates a flow chart showing an example process for adjusting a communications grid or a work project in a communications grid after a failure of a node, according to embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
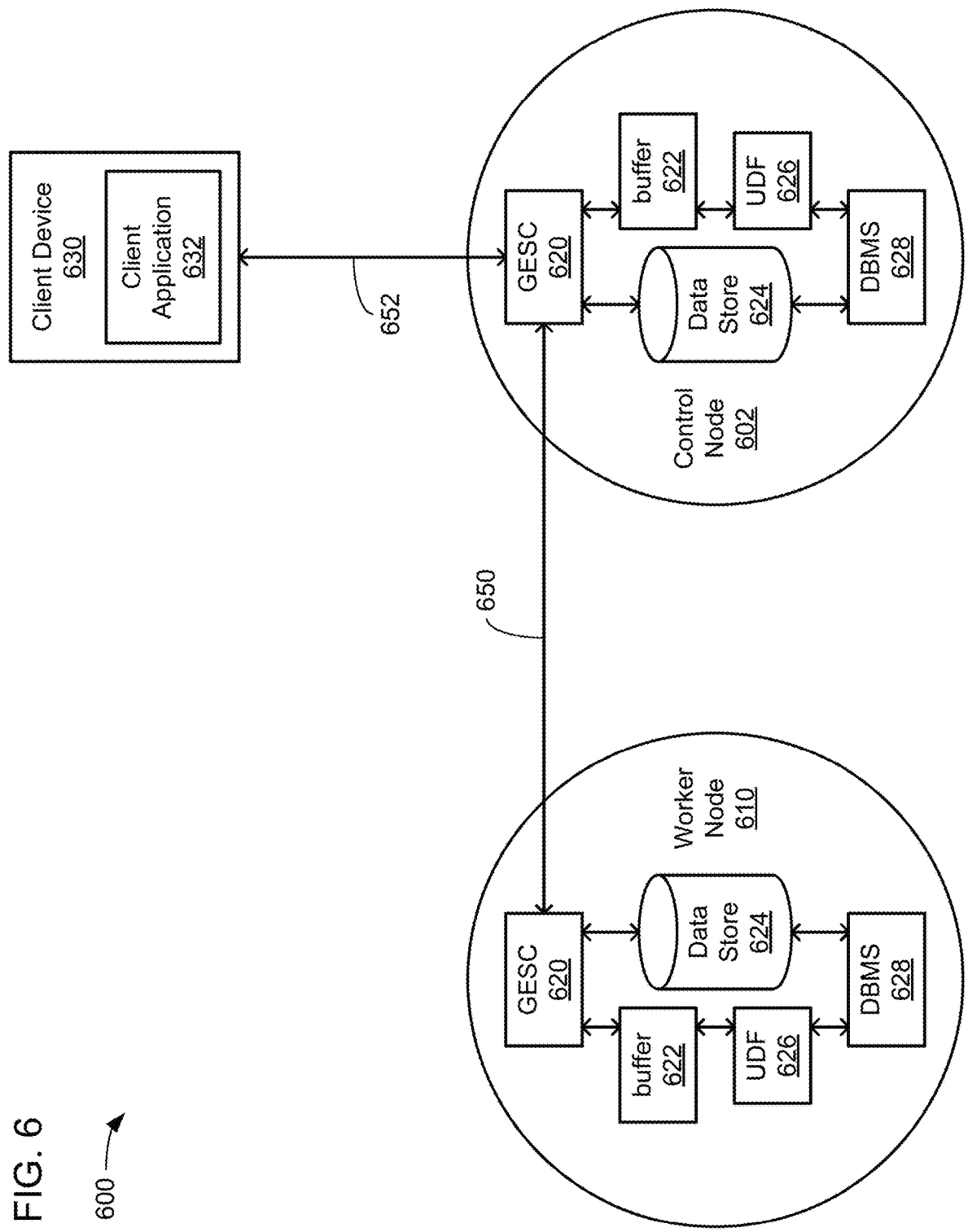
FIG. 6 illustrates a portion of a communications grid computing system including a control node and a worker node, according to embodiments of the present technology.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
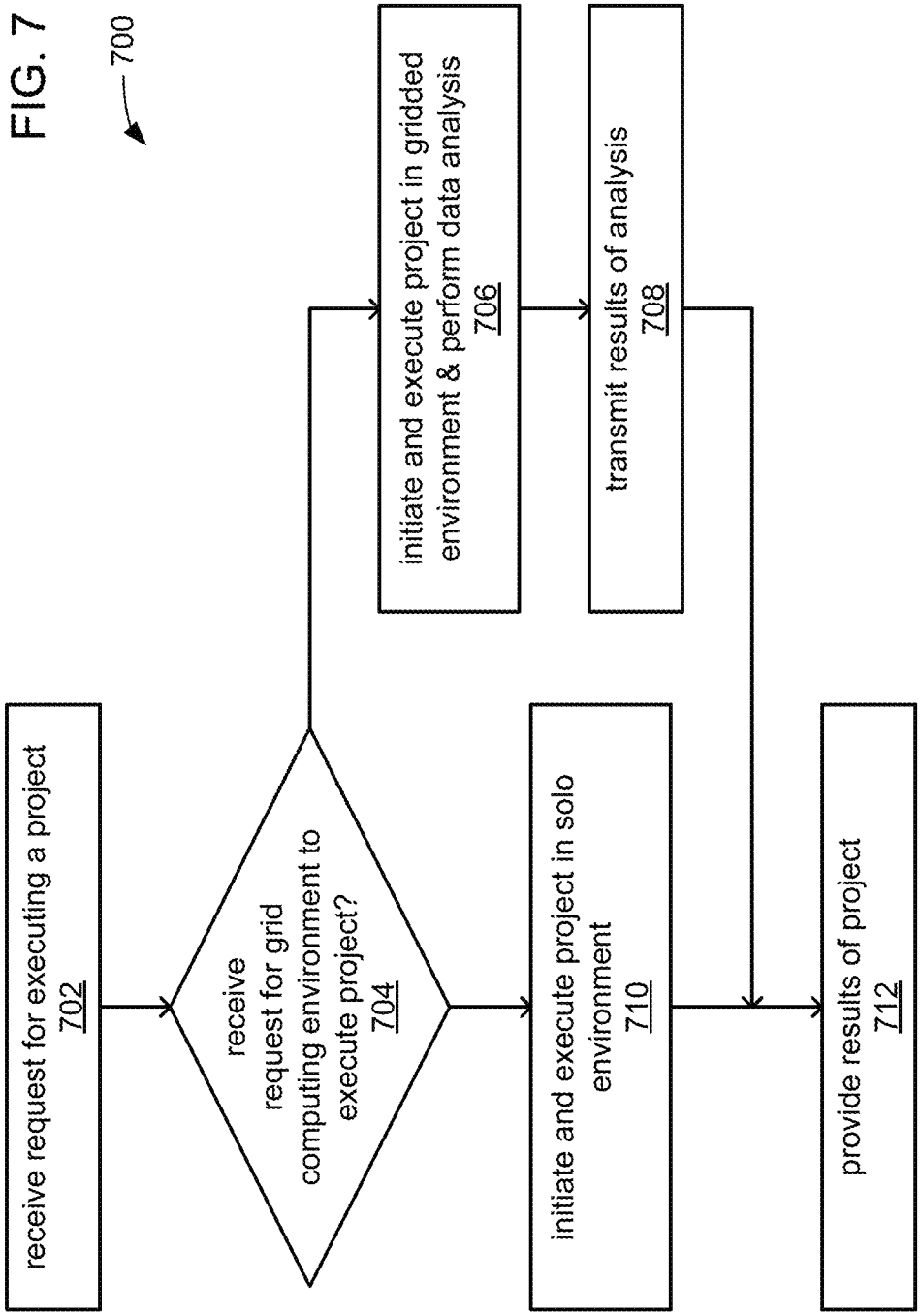
FIG. 7 illustrates a flow chart showing an example method for executing a project within a grid computing system, according to embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
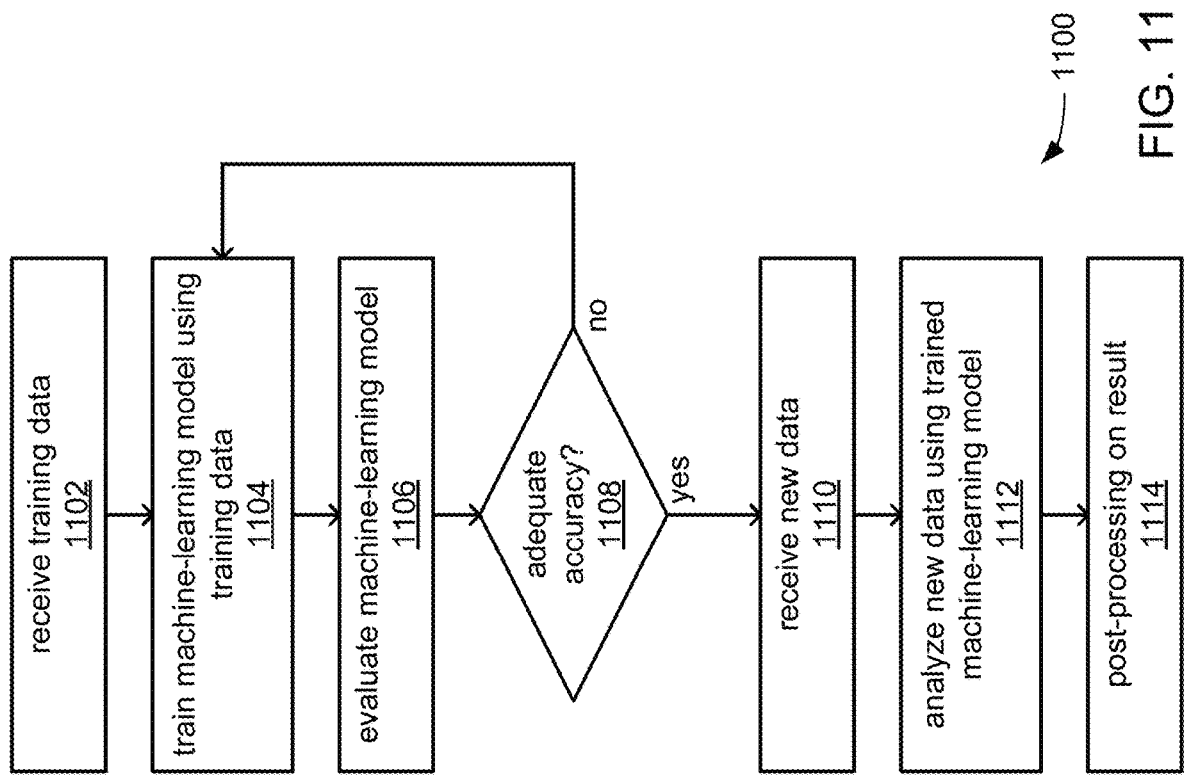
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
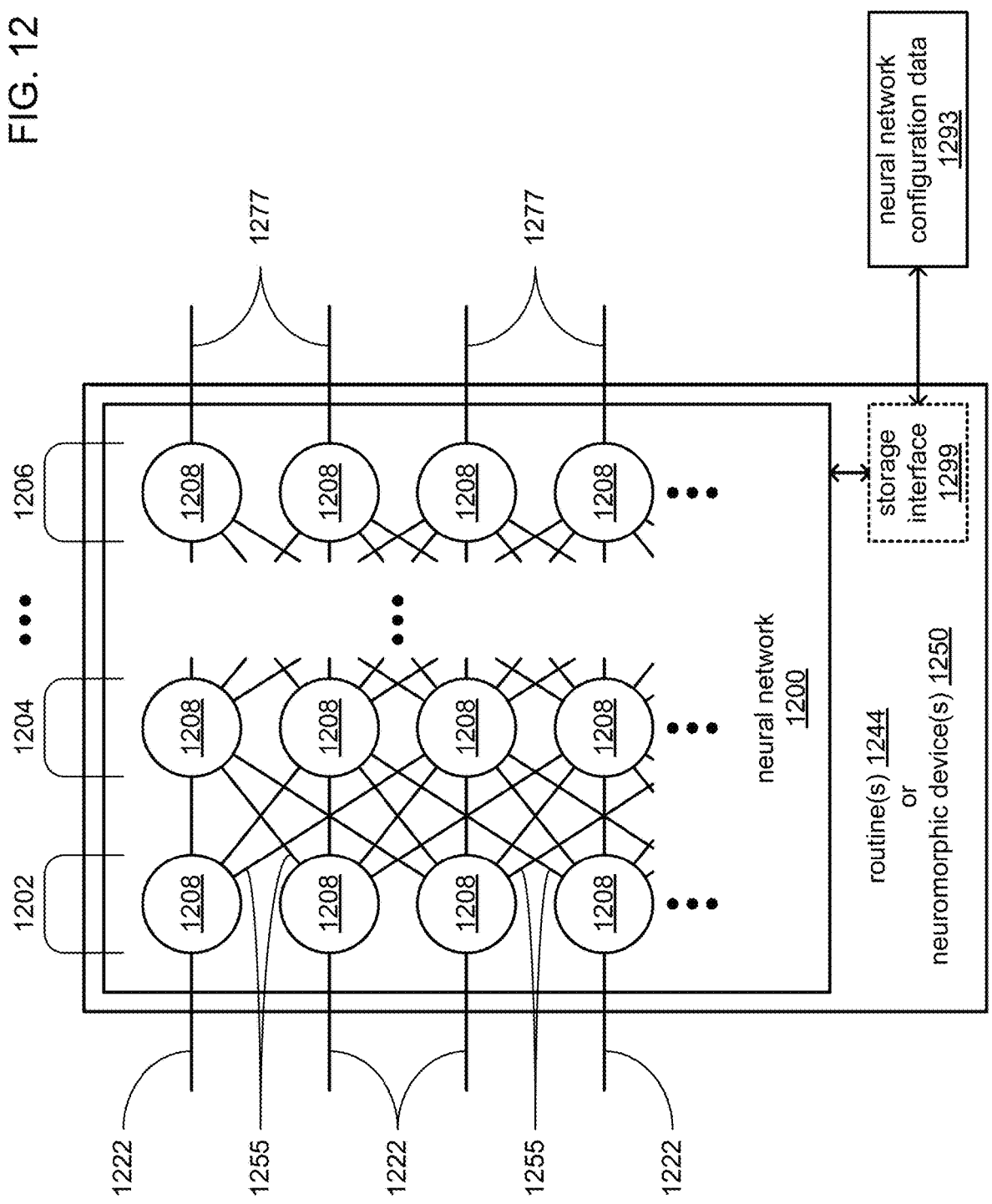
FIG. 12 is an example machine-learning model according to some aspects.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
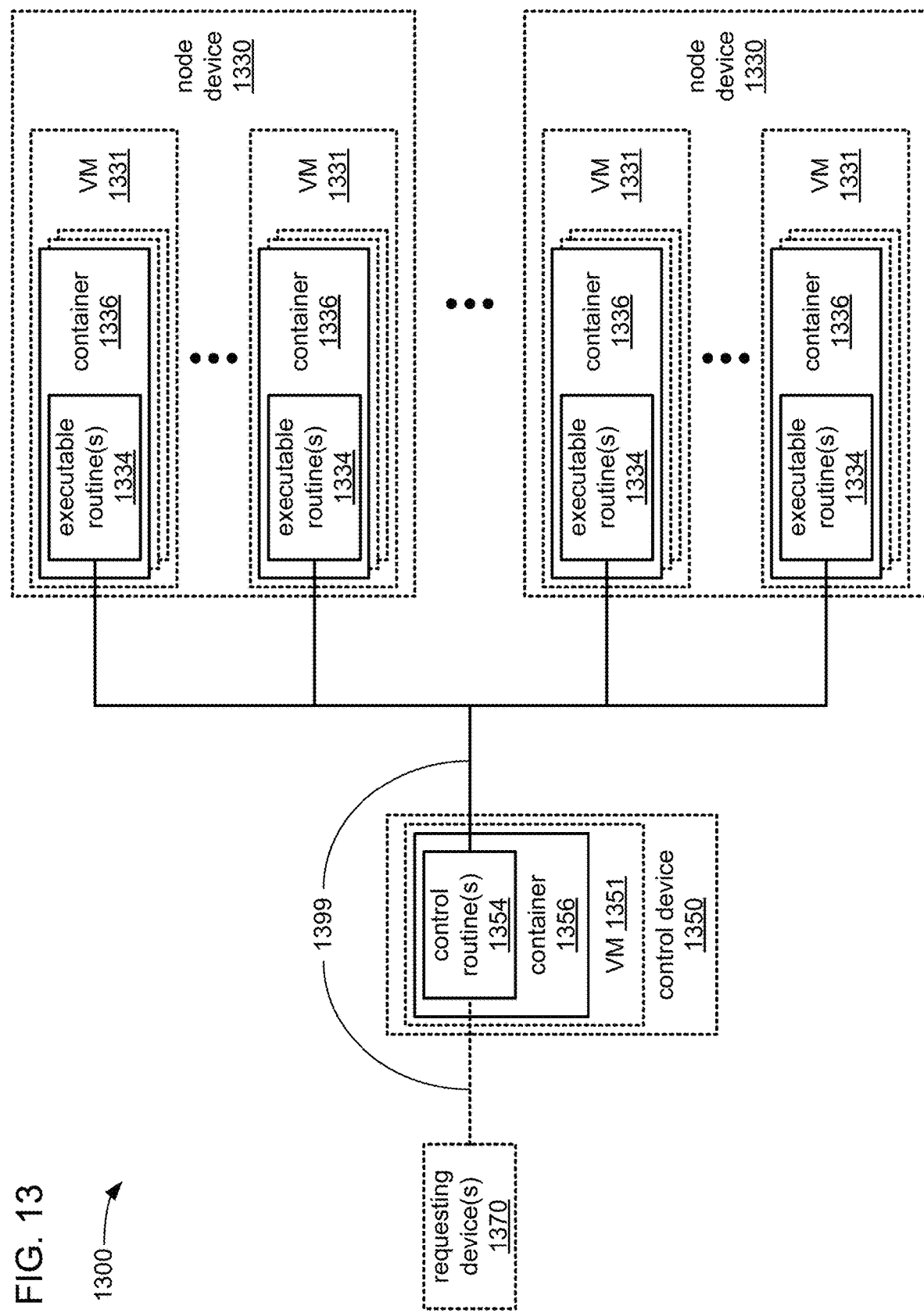
FIG. 13 illustrates various aspects of the use of containers as a mechanism to allocate processing, storage and/or other resources of a processing system to the performance of various analyses according to some aspects.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
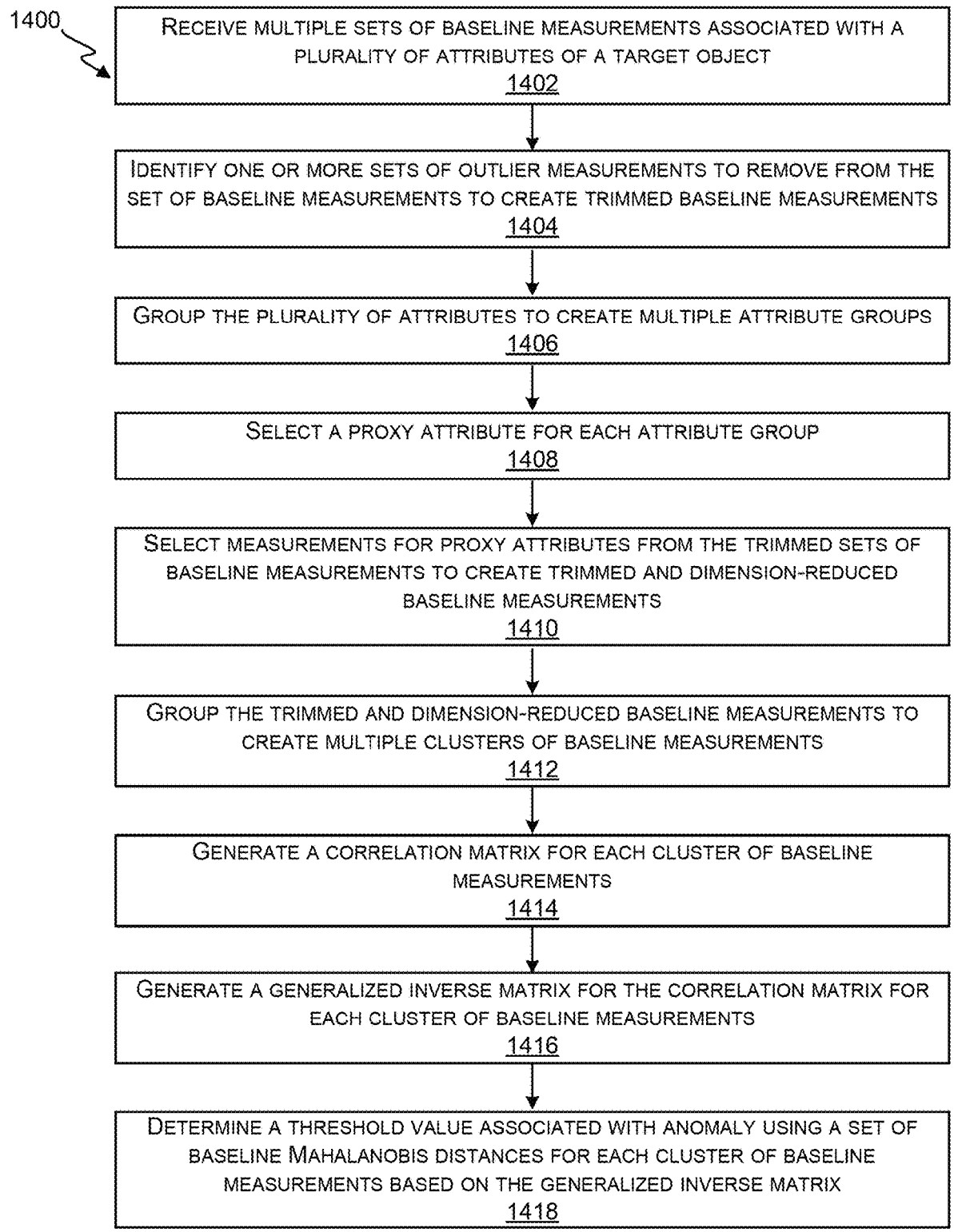
FIG. 14 is a flow chart of an example process for creating a Mahalanobis space of normal observations for a target object, according to some aspects.

FIG. 14 is a flow chart of an example process 1400 for creating a Mahalanobis space of normal observations for a target object, according to some aspects. Although FIG. 14 shows a certain number and sequence of operations for illustrative purposes, it will be appreciated that other examples may include more operations, fewer operations, different operations, or a different order of the operations than is shown in FIG. 14.

At block 1402, a processor receives multiple sets of baseline measurements associated with a plurality of attributes of a target object. The target object can be a physical device, a body part (e.g., a heart, lung, liver, brain, etc.), an enterprise, or an activity. An attribute of the target object can describe a certain measurable quality associated with the target object. In some examples, attribute values of the target objects can be measured by sensors, and the process can collect the measurements from the sensors. At one observation, one set of measurements for different attributes can be collected. The multiple sets of baseline measurements are collected from multiple normal observations. For example, the mold temperature, melt temperature, injection rate, injection pressure, and shot volume are attributes of an injection molding machine. These attributes can be monitored and measured to reflect if the injection molding machine is working in a normal condition or an abnormal condition. The mold temperature and the melt temperature can be measured by a thermometer, which is a temperature sensor.

At block 1404, the processor identifies one or more sets of outlier measurements to remove from the set of baseline measurements to create trimmed baseline measurements. Outlier measurements, such as measurements from faulty observations, can be identified and removed from the baseline measurements, for example using a multivariate outlier detection algorithm. In some examples, a SVDD algorithm is used for identifying and removing the outlier measurements from the baseline measurements to create the trimmed baseline measurements. The trimmed baseline measurements can be used for determining a covariance matrix for corresponding attributes. In some examples, prior to determining the covariance matrix, attributes corresponding the trimmed baseline measurements may be grouped and represented by proxy attributes, or the trimmed baseline measurements may be clustered, as described below.

At block 1406, the processor groups the plurality of attributes to create multiple attribute groups. In some examples, a large number of attributes associated with the target object have moderate to high correlation. The large number of attributes can then be grouped into multiple attribute groups by identifying highly correlated attributes. The highly correlated attributes can be grouped into one attribute group. For example, a factor analysis technique can be used to group the plurality of attributes by applying oblique rotations to principal components. The oblique rotations maximize the loadings of the attributes most associated with the specific principal component. An attribute group can include a set of attributes with maximal loadings on a specific principal component.

At block 1408, the processor selects a proxy attribute for each attribute group. A proxy attribute can be selected from each attribute group to represent the corresponding attribute group. For example, an attribute that maximizes the ratio of correlation to its group over the correlation to its nearest group can be selected as the proxy attribute for its group. The ratio increases the correlation to its group increases and the correlation to the nearest group decreases.

At block 1410, the processor selects measurements for proxy attributes from the trimmed sets of baseline measurements to create trimmed and dimension-reduced baseline measurements. A subset of the original attributes can be selected as proxy attributes to represent the full set of the original attributes. The measurements for the proxy attributes can then be selected from the trimmed sets of baseline measurements to create the trimmed and dimension-reduced baseline measurements for determining a correlation matrix later. Thus, the dimension of the correlation matrix can be reduced. In turn, the computation time can be reduced.

At block 1412, the processor groups the trimmed and dimension-reduced baseline measurements to create multiple clusters of baseline measurements. In some examples, a univariate analysis can be performed on the baseline measurements to detect univariate outlier observations. The univariate analysis can also determine if the baseline measurements represent a multimodal process. If a marginal univariate distribution indicates a multimodal process, a bivariate analysis can be performed to confirm if there are observational clusters. Multivariate analysis can be performed for applications where variables have high pairwise correlation. If the bivariate analysis confirms that there are observational clusters in the baseline measurements, the processor can implement a k-means clustering algorithm to classify the baseline measurements from each observation into a separate cluster. The number of clusters can be identified by iterating from 2 to a configured maximum number of clusters. For each number, the pseudo-F statistic can be computed and the number corresponding to the maximum pseudo-F can be chosen as the number of clusters.

At block 1414, the processor generates a correlation matrix for each cluster of baseline measurements. The correlation matrix includes correlation coefficients between different attributes variables of the target object. A correlation coefficient indicates a level of linear relationship between two attribute variables of the target object. The correlation matrix can be determined using baseline measurements collected from normal observations. When proxy attributes are selected, correlation coefficients for the proxy attributes can be determined based on the baseline measurements of the proxy attributes. The remainder measurements can be excluded from determining the correlation coefficients. Thus, the size of the correlation matrix can be reduced, which means the size of the measurement data can be reduced for processing during implementation. In some examples, the correlation coefficients can be determined using a fast MCD algorithm. The fast MCD algorithm can also remove outliers that increase the variance the most across all the attributes, thus creating a robust correlation matrix.

At block 1416, the processor generates a generalized inverse matrix for the correlation matrix for each cluster of baseline measurements. When the attribute variables are highly collinear (e.g., correlated), the correlation matrix can be singular, which may not be invertible, and a generalized inverse matrix can be generated instead. The plurality of attributes for a target object are often correlated and lead to a singular correlation matrix. Thus, a generalized inverse matrix can be used for creating a Mahalanobis space of normal observations for a target object. The generalized inverse matrix is a pseudo inverse of a correlation matrix including correlation coefficients between different attributes of the target object. In some examples, the generalized inverse matrix can be determined using a sweeping function. A complete orthogonal decomposition can be applied to the correlation matrix C, for example by Householder transformation in a rank-deficient least squares problem $\min_x \|Cx - I\|_2^2$. In the rank-deficient least squares problem, I is an identity matrix and the minimum Euclidean norm solution x is the generalized inverse matrix for the correlation matrix C.

A multidimensional space can be determined using the generalized inverse matrix, a vector of means m for the baseline measurements, and a vector of standard deviations s for the baseline measurements, which can be referred to as a Mahalanobis space. Each cluster of baseline measurements represents a separate subspace, which can be considered as an independent Mahalanobis space for purposes of MTS analysis.

At block 1418, the processor determines a threshold value associated with anomaly using a set of baseline Mahalanobis distances (MDs) for each cluster of baseline measurements based on the generalized inverse matrix. In a Mahalanobis space, an MD is a distance between a set of measurements and a centroid of the Mahalanobis space. The MD can be computed using the equation (1) below, where z is a standardized vector of a vector of measurements for the attribute variables and can be computed as z=(x−m)/s.

$$MD = z^T C^{-1} z \qquad (1)$$

As described above, a correlation matrix can be determined for each cluster, and a generalized inverse matrix can be determined for a corresponding correlation matrix. In turn, a set of baseline MDs can be determined for each cluster using a corresponding generalized inverse matrix, as illustrated in equation (1). A threshold value associated with an abnormal condition can be determined based on the set of baseline MDs. Thus, each cluster can have its own threshold value for abnormal condition. The example process 1400 illustrated by FIG. 14 for creating a Mahalanobis space of normal observations for the target object can be considered as a training phase of the ADD system. During the training phrase, the correlation matrix, the generalized inverse matrix, and threshold values associated with an abnormal condition are determined to be used for anomaly detection and diagnosis during an implementation phase of the ADD system.

Figure 15:
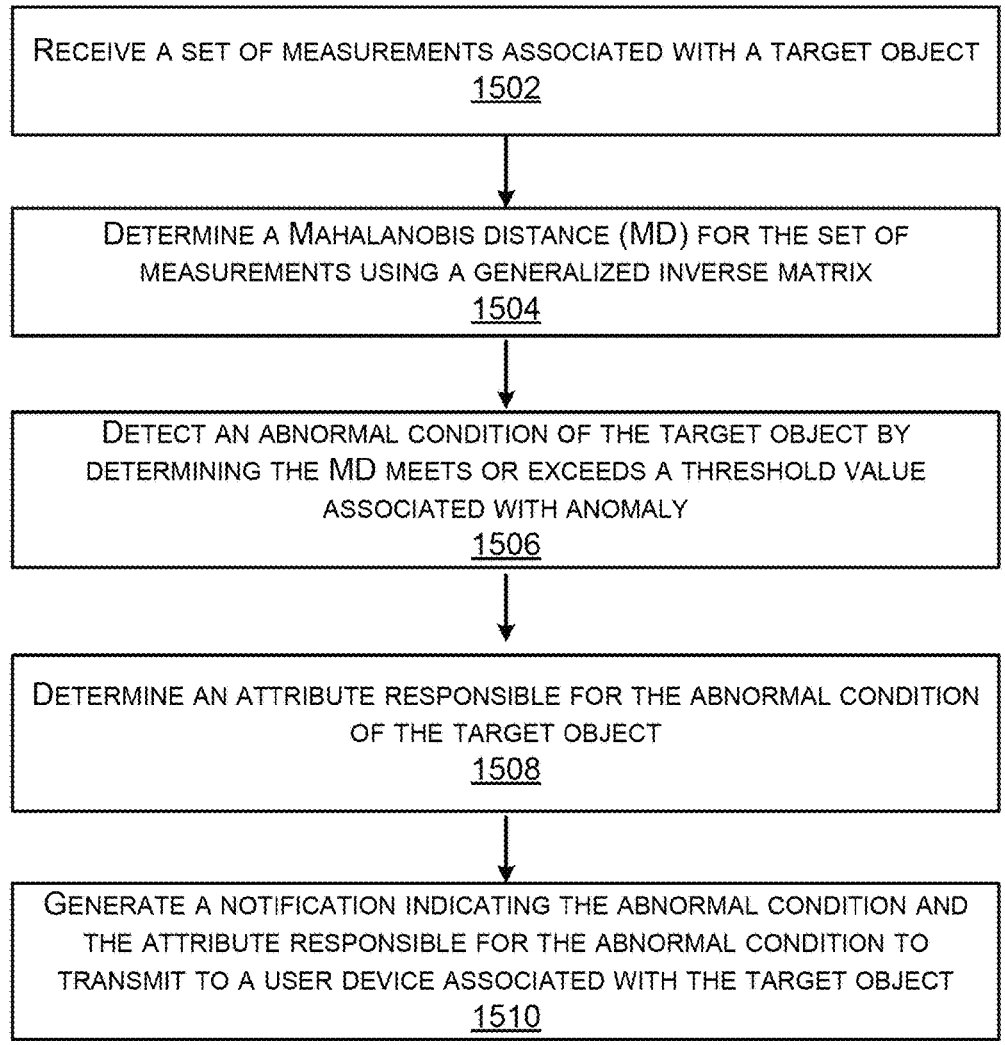
FIG. 15 is a flow chart of an example process for anomaly detection and diagnosis, according to some aspects.

FIG. 15 is a flow chart of an example process 1500 for anomaly detection and diagnosis, according to some aspects. Although FIG. 15 shows a certain number and sequence of operations for illustrative purposes, it will be appreciated that other examples may include more operations, fewer operations, different operations, or a different order of the operations than is shown in FIG. 15.

At block 1502, a processor receives a set of measurements associated with a target object. The set of measurements correspond to multiple attributes of the target object. The target object, its attributes, and corresponding measurements are described above at block 1402 in FIG. 14. Each attribute can be represented by a variable for MTS analysis, which can be referred to as an attribute variable hereafter. The attributes of the target object may change in certain situations, thus values of the attribute variables can be measured or quantified.

At block 1504, the processor determines a Mahalanobis distance (MD) for the set of measurements using a generalized inverse matrix. The MD for the set of measurement is a distance from the centroid of the Mahalanobis space created based on the generalized inverse matrix as described at block 1416 in FIG. 14. The MD can be calculated using equation (1) as described at block 1418 in FIG. 14.

At block 1506, the processor detects an abnormal condition of the target object by determining the MD meets or exceeds a threshold value associated with anomaly. The threshold value associated with anomaly is determined at block 1418 in FIG. 14. If the MD for the set of measurements meets or exceeds the threshold value, it indicates an abnormal condition. If the MD for the set of measurements does not meet the threshold value, it indicates the target object is in a normal condition.

At block 1508, the processor determines an attribute responsible for the abnormal condition of the target object. The processor can determine an importance score of each measurement in the set of measurements and select an attribute whose measurement has the highest importance score as the attribute responsible for the abnormal condition. The process for determining the attribute responsible for the abnormal condition based on importance scores is described in greater detail later on with respect to FIG. 16.

At block 1510, the processor generates a notification indicating the abnormal condition and the attribute responsible for the abnormal condition to transmit to a user device associated with the target object. In some instances, the notification can be transmitted to notify a system administrator so that a corrective action can be taken for the target object. Additionally or alternatively, the processor can transmit one or more electronic signals to a control system (e.g., over a network, such as a local area network or the Internet) associated with the target object. The one or more electronic signals may indicate the anomaly. The control system can receive the electronic signals and, in response, automatically perform one or more operations to mitigate the abnormal condition. For example, an ADD system analyzes the measurements for different attributes of the injection molding machine, detects an abnormal condition, and determines that the mold temperature is responsible for this abnormal condition, as described in FIGS. 14-16. The ADD system can transmit an electronic signal to a control system of the injection molding machine, indicating the injection molding machine may be experiencing an abnormal condition and the mold temperature may have created the abnormal condition. The control system can automatically determine the mold temperature is too high based on its measurements and take actions to reduce the mold temperature. For example, the control system can increase the coolant flow through the mold or reduce the coolant temperature. The ADD system can detect an abnormal condition before the abnormal condition becomes a problem. In the example of the injection molding machine, the abnormal condition caused by high mold temperature can be detected so that the mold temperature can be reduced before it causes burn marks on the molding products.

In some instances, the processor can determine a type of the abnormal condition by analyzing the measurement of the attribute responsible for the abnormal condition. In some examples, the correlation matrix may be created using baseline measurements for proxy attributes. The attribute whose measurement has the highest importance score can then be a proxy attribute representing a group of similar attributes. The processor can determine a type of abnormal condition by analyzing the group of attributes represented by the proxy attribute with the highest importance score. After determining the type of the abnormal condition, the processor can include the type of the abnormal condition in the notification and/or control signals, which may help the recipient to better mitigate the abnormal condition.

Figure 16:
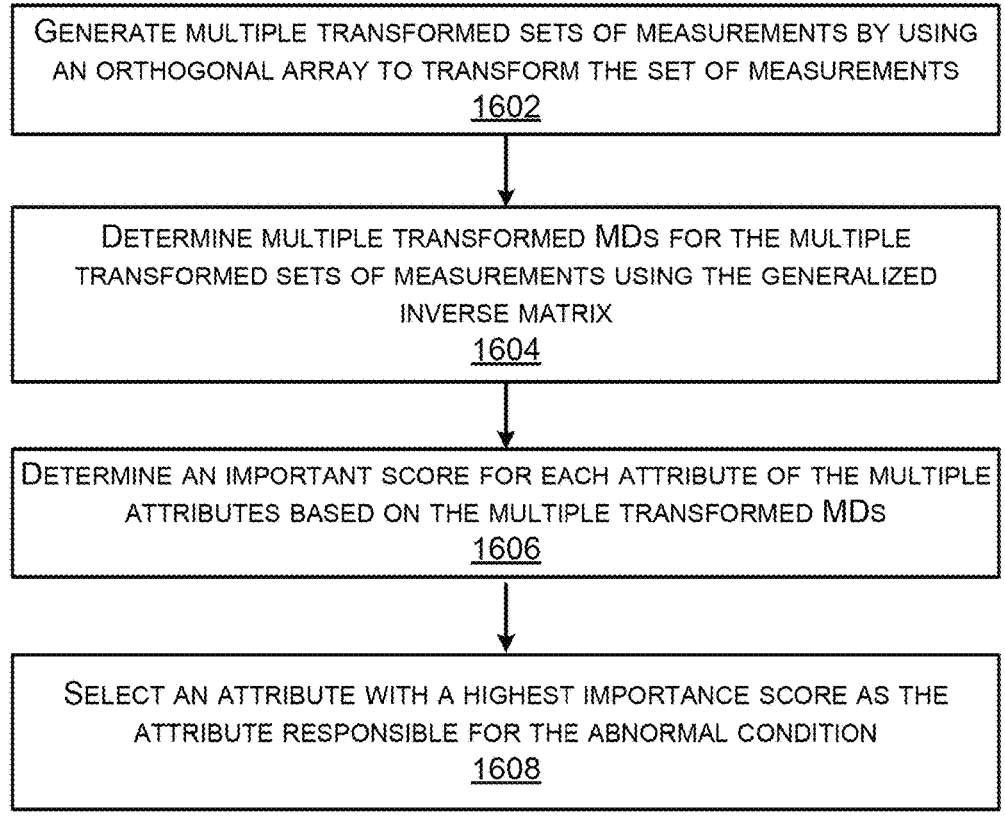
FIG. 16 is a flow chart of an example process for determining the attribute responsible for the abnormal condition, according to some aspects.

FIG. 16 is a flow chart of an example process 1600 for determining the attribute responsible for the abnormal condition, according to some aspects. Although FIG. 16 shows a certain number and sequence of operations for illustrative purposes, it will be appreciated that other examples may include more operations, fewer operations, different operations, or a different order of the operations than is shown in FIG. 16.

At block 1602, a processor generates transformed sets of measurements by using an orthogonal array (OA) to transform the set of measurements (e.g., received in block 1502). An OA can be used to reduce the number of fractional factorial experiments in which orthogonality or independence among the various factors and certain interactions can be assured. At least one measurement of the set of measurements can be excluded from each of the transformed sets of measurements. At least one excluded measurement for one transformed set of measurements corresponds to an attribute that is different from the attributes corresponding to the excluded measurements for other transformed sets of measurements. In some examples, a standard OA is selected depending on the number of attributes that are important for diagnosing the abnormal condition. In an experiment for an ADD system, each attribute can have two levels, present or absent. For example, when there are three attributes associated with a target object, a standard two-level three-factor OA as shown in Table 1 below can be selected to transform a set of three measurements for the three attributes into four transformed sets of measurements for experiments. Each attribute variable can be assigned to a column of the standard two-level three-factor OA. In Table 1, 0 indicates an absence of an attribute variable meaning the attribute variable is excluded, and 1 indicates the presence of an attribute variable. The first row indicates the absence of all three attribute variables. The second row indicates absence of the first attribute variable. The third row indicates absence of the second attribute variable. The fourth row indicates absence of the third attribute variable.

TABLE 1

A Standard Two-Level Three-Factor OA Orthogonal Array

|  | Column 1 | Column 2 | Column 3 |
|---|---|---|---|
| Experiment 1 | 0 | 0 | 0 |
| Experiment 2 | 0 | 1 | 1 |
| Experiment 3 | 1 | 0 | 1 |
| Experiment 4 | 1 | 1 | 0 |

If an abnormal condition is detected based on an MD for the set of three measurements exceeding the threshold value, the standard two-level three-factor OA can be used to transform the set of three measurements to four transformed sets of measurements for four experiments to diagnose the abnormal condition and identify the responsible attribute.

At block 1604, the processor determines transformed MDs for the transformed sets of measurements using the generalized inverse matrix. An MD can be calculated for each transformed set of measurements. Following the example above, there can be four transformed MDs for the four transformed sets of measurements, even though the MD for the first transformed set can be 0 since all the three attribute measurements are absent.

At block 1606, the processor determines an importance score for each attribute of the multiple attributes based on the transformed MDs. The important score for each attribute can be determined based on a difference between (i) an average of transformed MDs in which measurements for the attribute are present and (ii) an average of transformed MDs in which measurements for the attribute are excluded.

In some examples, an accuracy value can be determined for transformed MDs in which an attribute is present and in which the attribute is absent respectively. An accuracy value (AV) for the transformed MDs in one type of experiment where the attribute is present or absent can be computed using the equation (2) below. Equation (2) assumes that multiple observations are available for the abnormal condition. If only one observation for the abnormal condition is available, t=1.

$$AV = -10\log_{10}\left[\frac{1}{t}\sum_{i=1}^{t}\frac{1}{MD_i}\right] \quad (2)$$

An average accuracy value (AAV) can be obtained for the transformed MDs in the types of experiments where the attribute is present. Similarly, an AAV can be obtained for the transformed MDs in the types of experiments where the attribute is absent. The importance score (IS) for each attribute can be computed as the difference between the AAV for the transformed MDs where the attribute is present and the AAV for the transformed MDs where the attribute is absent, using the equation (3) below. In equation (3), $AAV_j^+$ is the average accuracy value for transformed MDs when the attribute j is present in corresponding transformed sets of measurements, and $AAV_j^-$ is the average accuracy value for transformed MDs when the attribute j is absent in the corresponding transformed sets of measurements.

$$IS_j = AAV_j^+ - AAV_j^- \quad (3)$$

Following the example above, in which the set of three measurements is from one observation for attribute A, attribute B, and attribute C, four transformed sets can be created. And, four corresponding transformed MDs can be determined. The importance score for attribute A can be computed as the difference between (i) the AAV computed for experiments 3 and 4, where attribute A is present, as shown in Table 1 and (ii) the AAV computed for experiments 1 and 2, where attribute A is absent, as shown in Table 1.

At block 1608, the processor selects an attribute with a highest importance score as the attribute responsible for the abnormal condition. An importance score can be obtained for each measurement at block 1506, the highest importance score indicates the highest importance level for a corresponding measurement in creating the abnormal condition. The attribute whose measurement has the highest importance score can be selected as the attribute that created the abnormal condition.

Figure 18:
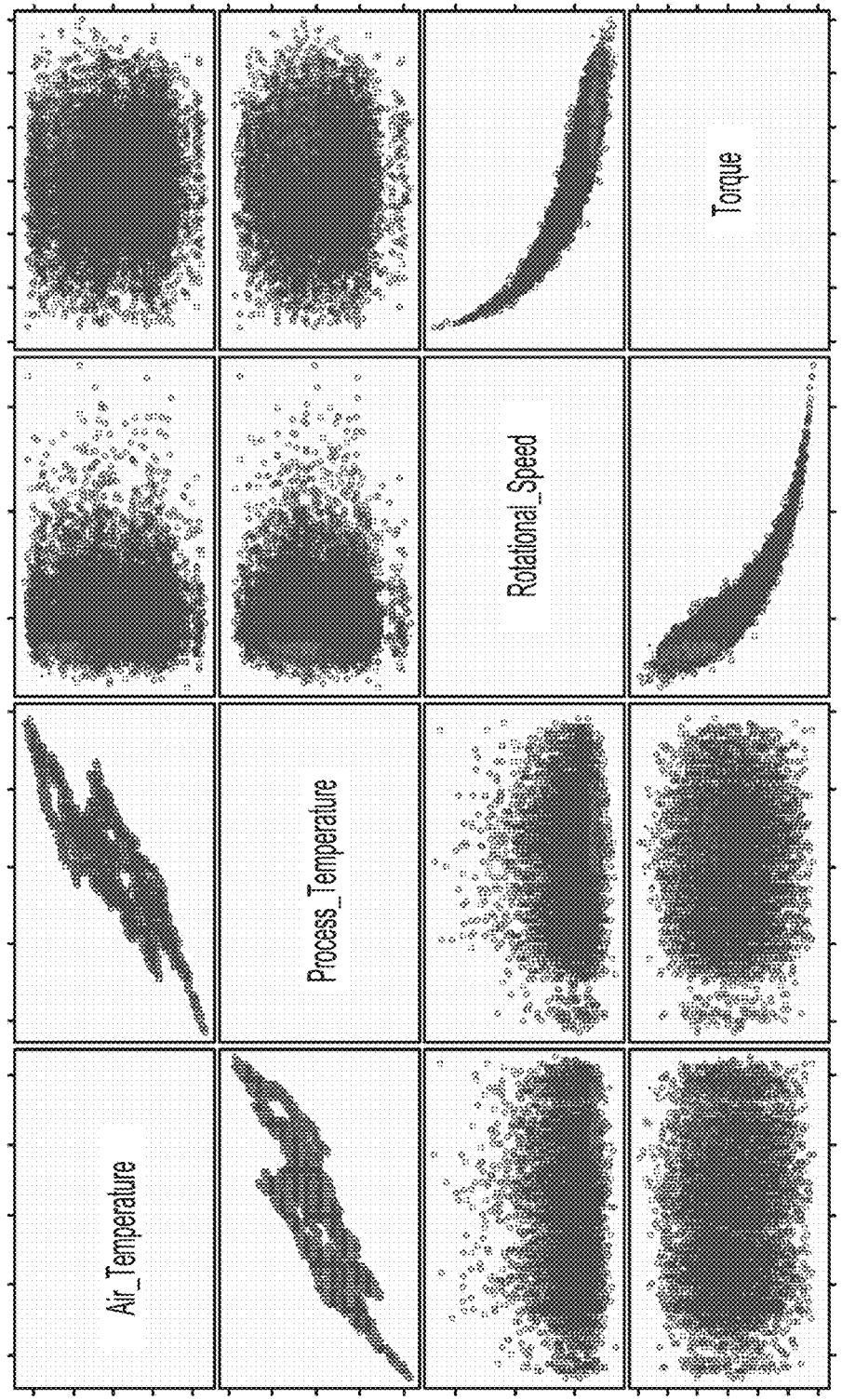
FIG. 18 illustrates an example of a bivariate marginal distribution of four attributes associated with the industrial machine in FIG. 17, according to some aspects.
Figure 21:
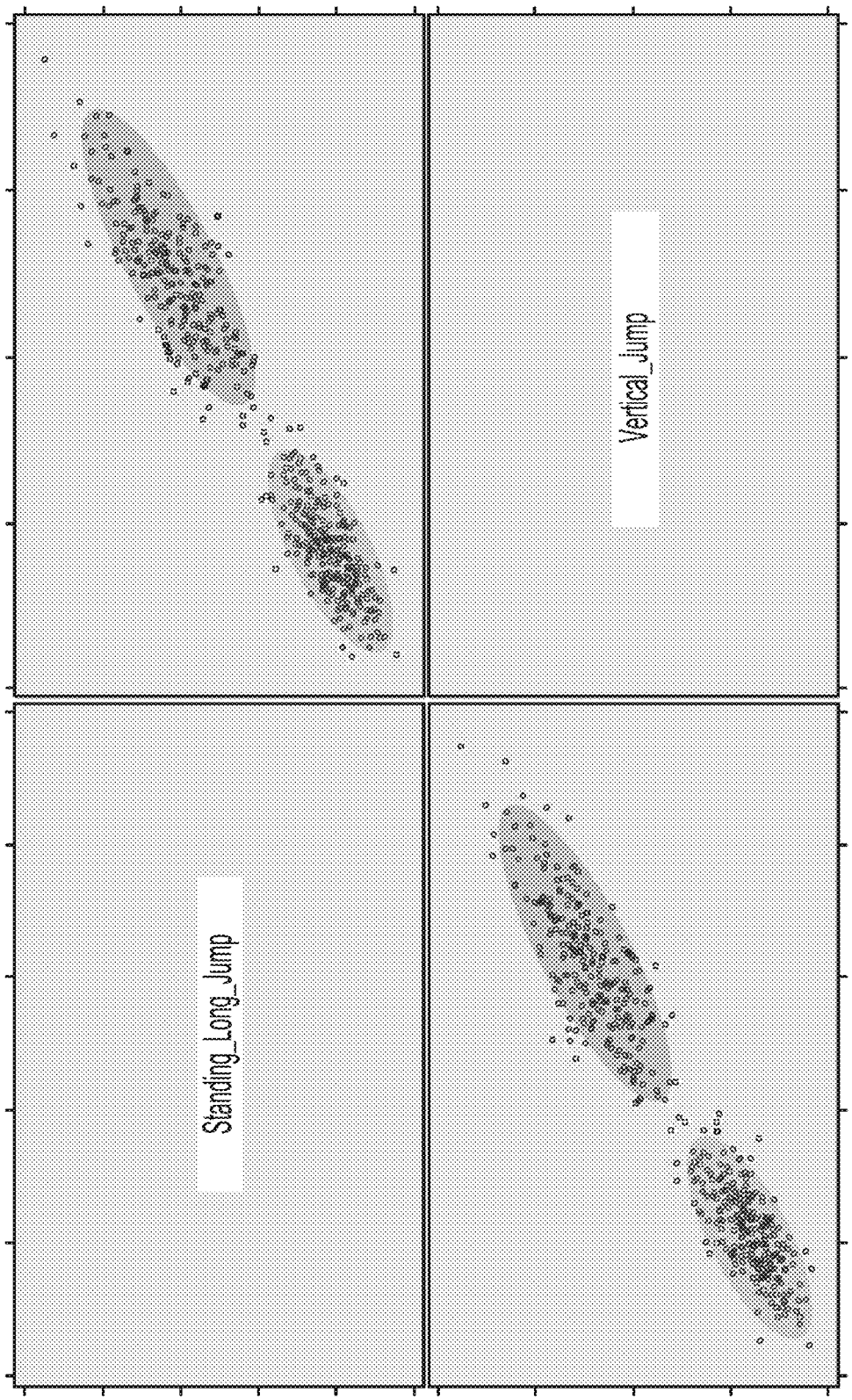
FIG. 21 illustrates an example of a bivariate marginal distribution of standing long jump measurements and vertical jump measurements in FIG. 20, according to some aspects.

The improved ADD system as described in FIGS. 14-16 can be used in different applications. These different applications have certain common features, for example, that multiple measurements correspond to multiple attribute variables, a majority of the measurements correspond to normal conditions, abnormal conditions are infrequent, the multiple attribute variables usually correlate, detection of abnormal condition is important, and identification of attribute variables which create the abnormal conditions is important. FIGS. 17-26 illustrates three use cases for the improved ADD system in the present disclosure. FIGS. 17-19 are about detecting an abnormal condition and a responsible attribute for an industrial machine. FIGS. 20-22 are about identifying talented athletes and their specific exceptional skills. FIGS. 23-26 are about identifying overall high occupancy days in competitive entities and the competitive entity whose rate causes the high occupancy. But any number of other applications and use cases are possible.

Now referring to FIG. 17, FIG. 17 illustrates an example dataset 1700 associated with an industrial machine, according to some aspects. The example dataset 1700 is one section from the AI4I 2020 predictive maintenance dataset, which is created to simulate real predictive maintenance encountered in industry. The AI4I 2020 predictive maintenance dataset consists of 9,767 data points stored as rows with seven columns. Column 1 is Unique identifier (UID) 1702. Column 2 is Product ID 1704, each of which consists of a letter L, M, or H for low, medium, or high as product quality variants and a variant-specific serial number. Column 3 is air temperature 1706, which is the ambident temperature in Kelvin. Column 4 is process temperature 1708, which is internal temperature of a machine in Kelvin. Column 5 is rotational speed (rpm) 1710 of a motor. Column 6 is torque 1712 that is produced by a chain drive in Newton meters. Column 7 is Heat Dissipation Failure 1714, representing whether or not there is a failure in overheating due to small differences in air and process temperatures, where 0 indicates no failure and 1 indicates failure. In this example, four attributes for the industrial machine, air temperature 1706, process temperature 1708, rotational speed 1710, and torque 1712, are measured.

A univariate analysis (not shown) determines that the univariate distribution is multi-modal. In other words, the measurements of the four attributes illustrated in FIG. 17 can be clustered into more than one cluster. Then a bivariate analysis can be performed for the measurements of the four attributes.

FIG. 18 illustrates an example of a bivariate marginal distribution 1800 of four attributes associated with the industrial machine in FIG. 17, according to some aspects. The bivariate marginal distribution shows that air temperature and process temperature are jointly elliptically distributed except for the tail observations. That is, the air temperature and the process temperature can be used as attribute variables and analyzed by the ADD system described in the present disclosure. In contrast, torque and rotational speed are not elliptically distributed in any joint bivariate distributions. That is, the torque and rotational speed cannot be analyzed by the ADD system described in the present disclosure.

A correlation matrix for the two attributes, air temperature and process temperature, can be determined based on normal measurements. A set of baseline MDs for the normal measurements can be determined using a generalized inverse of the correlation matrix. An MD threshold associated with an abnormal condition can be determined based on the set of baseline MDs, generally as described in FIG. 14. Here, the MD threshold can be set at 1.5. It is shown that the 86 of the 115 heat dissipation faults were detected by the ADD system using 1.5 as the MD threshold. The MD threshold can be reduced lower to detect more faults. However, it may come at the cost of more false positives.

For the detected heat dissipation faults, an important score can be determined for each attribute, as described in FIG. 16. FIG. 19 illustrates an example of the importance scores of the air temperature 1902 and the importance scores of the process temperature 1904 for detected heat dissipation faults, according to some aspects. In this example, the importance scores of the air temperature 1902 are all positive, and the importance scores of the process temperature 1904 are all negative. Thus, the importance scores of the air temperature 1902 are greater than the importance scores of the process temperature 1904. It can be concluded that the air temperature caused the heat dissipation faults and some actions on the air temperature can be taken to mitigate the heat dissipation faults.

FIG. 20 illustrates an example of athletic measurements 2000 of leg power for 16-year-old participants, according to some aspects. Athletic performance data on leg power can be used to identify athletes for participation in track and field, football, basketball, and other sports. Additionally on the other end of spectrum it can be used to identify students that may underperform, which can be a first step in wellness, fitness, and medical screening. An ADD system can assist in identifying individuals that overperform or underperform and also identifying the specific measurements that contribute to overperformance or underperformance. In this example, column 1 is row number, column 2 includes measurements for standing long jump, column 3 includes measurements for vertical jump, and column 4 is student ID. Standing long jump and vertical jump are measured in centimeters.

A univariate analysis (not shown) of standing long jump measurements and vertical jump measurements determines that distribution of the standing long jump measurements and the distribution of vertical jump measurements are both bimodal. It indicates that there may be clusters of observations. Then a bivariate analysis can be performed.

FIG. 21 illustrates an example of a bivariate marginal distribution 2100 of standing long jump measurements and vertical jump measurements in FIG. 20, according to some aspects. It shows two distinct elliptical clusters of observations, which may indicate gender difference in the measurements. In addition, some outlier measurements can also be noted. The outlier measurements can be detected and removed from the measurements to leave only normal measurements. The normal measurements in each cluster can be used to determine the correlation matrix and the generalized inverse matrix of the correlation matrix for each cluster, generally as described in FIG. 14. A set of baseline MDs for the normal measurements in each cluster can be used to determine a threshold MD for each cluster. Here, the threshold MD for both clusters can be set at 3. Outlier athletes can be identified based on MDs of corresponding measurements exceeding the threshold MD of 3. Once the outlier athletes are identified with their corresponding measurements, importance scores for the measurement for standing long jump and the measurement for vertical jump can be determined, as described in FIG. 16.

FIG. 22 illustrates an example of the importance scores of the standing long jump 2202 and the importance scores of the vertical jump 2204, according to some aspects. The attribute with higher importance score can assist for recruitment. For example, outlier athletes with higher importance score on standing long jump can be recruited for track and field, soccer, and football. Outlier athletes with higher importance score on vertical jump can be recruited for track and field, basketball, and volleyball. If the difference between the importance score for standing long jump and the importance score for vertical jump is not radical, for example within a predetermined threshold (e.g., 2), then the corresponding outlier athlete is versatile and can be recruited for multiple sports. In this example, student IDs 4477, 4600, 4624, and 4706 have higher positive importance scores on standing long jump, higher than those of other students, and higher than the importance scores of their vertical jump measurements. It can be determined that they can be recruited for track and field, soccer, and football at minimum. Student IDs 4513, 4751, and 4778 have higher importance scores on vertical jump, higher than those of other students, and higher than the importance scores of their standing long jump measurements. It can then be determined that they can be recruited for track and field, basketball, and volleyball at the minimum. Student IDs 4374, 4519, 4536, and 4756 have close importance scores on standing long jump and vertical jump. It can be determined that they can be recruited for multiple sports.

Figure 23:
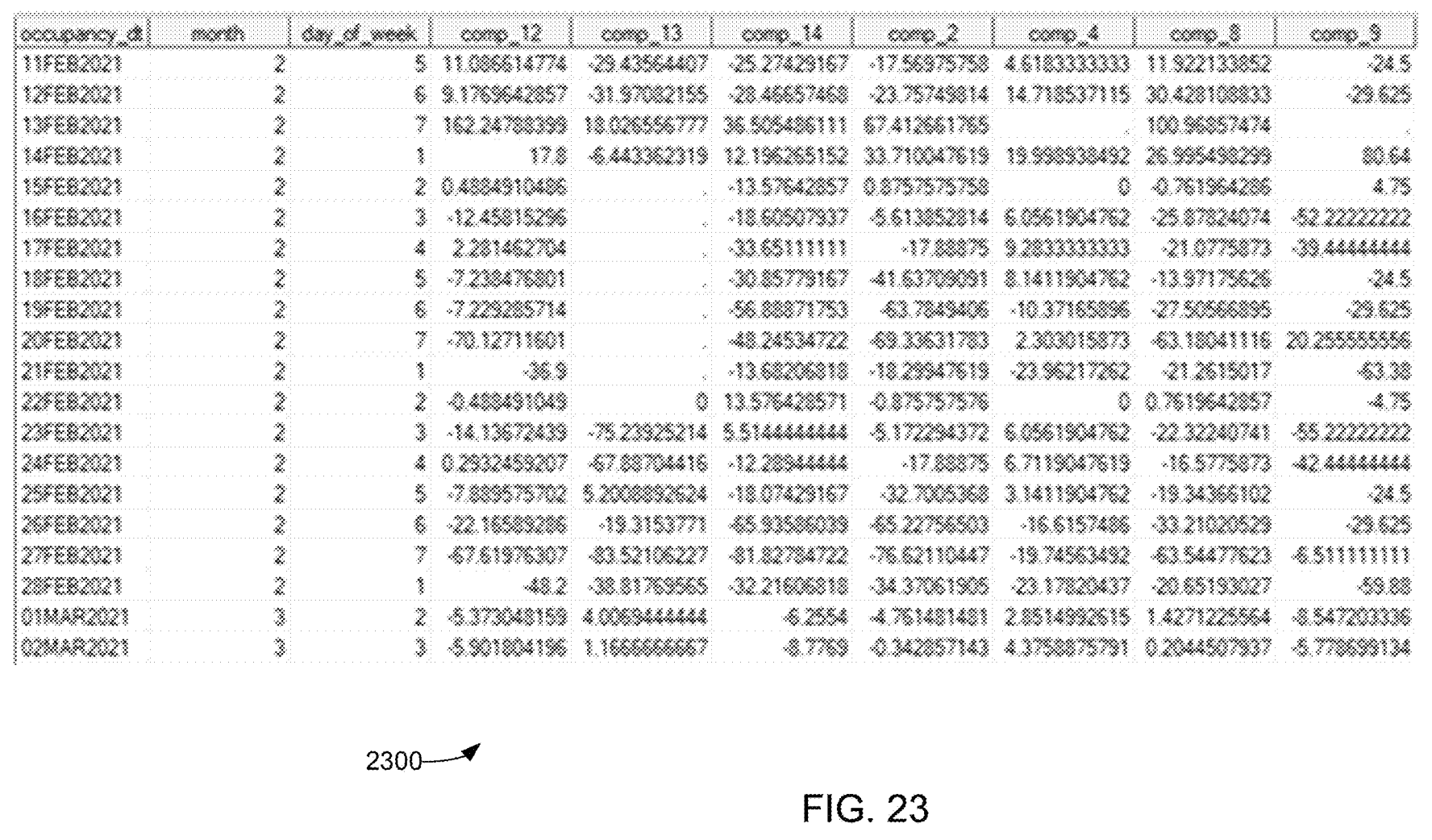

FIG. 23 illustrates example rate residuals 2300 for seven competitive entities during a period of time, according to some aspects. Prices for certain offerings at the seven competitive entities are time series data where the mean competitor price changes systematically over time. This is due to differences in demand for different days of the week and different periods of the year. However, attribute measurements analyzed in the ADD system usually have a constant mean over time. Therefore, a general linear model is implemented to model the systematic variation in pricing with price residuals. Therefore, the price residuals in FIG. 23 are processed using the ADD system in the present disclosure to identify outlier price observations and further determine which competitive entity's pricing influences the outlier observations the most. In this example, price residuals during a period of time for seven competitive entities, competitor 12, competitor 13, competitor 14, competitor 2, competitor 4, competitor 8, and competitor 9, are analyzed. It is noted that some competitor price data is missing in FIG. 23. In this example, if one or more competitors have missing prices on the same day, then the observation for that day is removed from consideration. In this example, the observation on Feb. 13, 2021 can be removed since the price data from competitor 4 and competitor 9 is missing.

Figure 24:
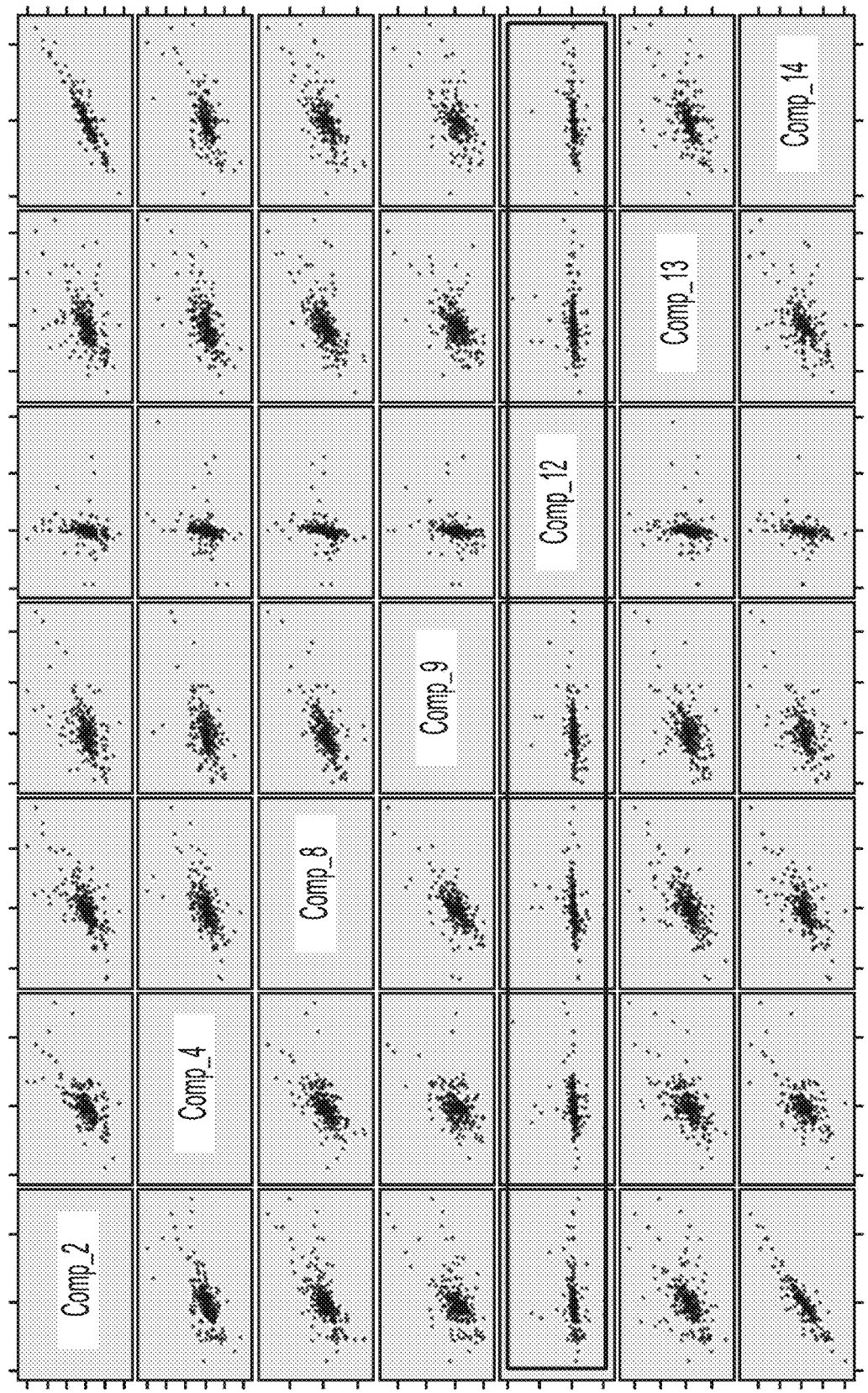
FIG. 24 illustrates an example of a bivariate marginal distribution of the rate residuals for the seven competitive entities in FIG. 23, according to some aspects.

FIG. 24 illustrates an example of a bivariate marginal distribution 2400 of the rate residuals for the seven competitive entities in FIG. 23, according to some aspects. FIG. 24 shows strong pairwise correlation in rate residuals (e.g., price residuals). This can be expected since all the seven competitive entities are competing within the same geographic market. The only exception is competitor 12 showing more variation in the price residuals and less correlation with the other competitor price residual. The bivariate marginal distribution in FIG. 24 also shows that there is no clustering of observations on the price residuals. Outlier observations can also be detected and removed to leave only normal observations as baseline observations. The baseline observations can be used to determine the correlation matrix and the generalized inverse matrix. A set of baseline MDs for the baseline measurements can be used to determine a threshold MD, generally as described in FIG. 14. Additionally, since there are seven competitor prices to monitor in each observation, these seven competitive entities can be clustered into different groups to reduce dimensionality. Competitive entities that highly correlate with other competitive entities in terms of pricing can be clustered into one group and one proxy entity is selected to represent the whole group. During implementation, outlier observations can be identified based on MDs of corresponding observations exceeding the threshold MD.

FIG. 25 illustrates outlier observations 2500 among a group of observations for the seven competitive entities during another period of time, according to some aspects. In this example, the MD threshold is set at 3, and 14 outlier observations are identified for the other period of time. Once outlier observations are identified, importance scores for the price residuals of the seven competitive entities in each observation can be determined, as described in FIG. 16.

Figure 26:
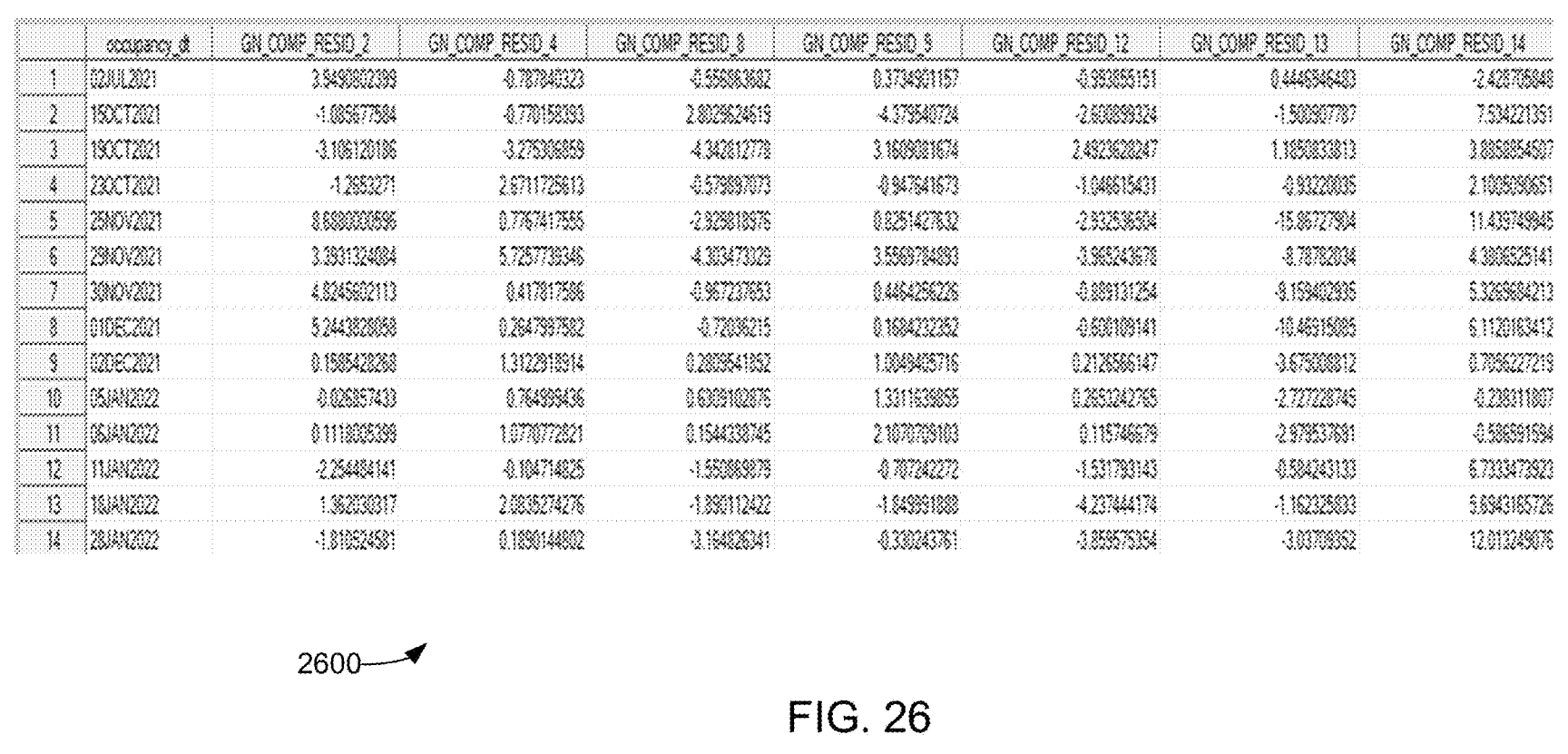

FIG. 26 illustrates importance scores of the rate residuals for the seven competitive entities in the outlier observations in FIG. 25, according to some aspects. The price residual that has the highest importance score in an outlier observation represents that the corresponding entity's pricing influences the outlier observation the most. The identified outlier observations and the corresponding most influential competitors that lead to the outlier observations can be used to investigate demand patterns and pricing issues. For example, for the outlier observation on Jul. 2, 2021, competitor 2 has the greatest importance score. That means, competitor 2 is the biggest factor that caused Jul. 2, 2021 as an outlier. Going back to FIG. 25, the price residual for competitor 2 on Jul. 2, 2021 is very low. That means, the price at competitor 2 is much lower than the seasonal average price. Certain actions can be taken to investigate why the price at competitor 2 is much lower.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system, comprising:
one or more processors; and
one or more memory devices including instructions that are executable by the one or more processors for causing the one or more processors to:
receive a set of measurements from a plurality of sensors associated with a network-connected device, the set of measurements corresponding to a plurality of attributes of the network-connected device;
determine a Mahalanobis distance for the set of measurements using a generalized inverse matrix, wherein the Mahalanobis distance is a distance between the set of measurements and a centroid of a multidimensional space, wherein the multidimensional space is based on the generalized inverse matrix;
generate an orthogonal array based on how many measurements are in the set of measurements;
compare the Mahalanobis distance to a threshold value associated with an abnormal condition of the network-connected device; and
in response to determining that the Mahalanobis distance meets or exceeds the threshold value, determine an attribute responsible for the abnormal condition of the network-connected device by:
generating transformed sets of measurements by using the orthogonal array to transform the set of measurements, wherein at least one measurement of the set of measurements is excluded from each of the transformed sets of measurements;
determining transformed Mahalanobis distances for the transformed sets of measurements using the generalized inverse matrix;
determining an importance score for each attribute of the plurality of attributes of the network-connected device based on differences between (i) an average of transformed Mahalanobis distances in which measurements for the attribute are present and (ii) another average of transformed Mahalanobis distances in which measurements for the attribute are excluded; and
selecting one of the plurality of attributes that corresponds to a highest importance score as the attribute responsible for the abnormal condition;
generate a notification indicating the abnormal condition and the attribute responsible for the abnormal condition; and
transmit the notification to a user device of a user associated with the network-connected device.

2. The system of claim 1, wherein the one or more memory devices further include instructions that are executable by the one or more processors for causing the one or more processors to:
  receive another set of measurements associated with the network-connected device;
  determine another Mahalanobis distance for the other set of measurements;
  determine that the other Mahalanobis distance is below the threshold value; and
  determine that the network-connected device is in a normal condition based on the other Mahalanobis distance being below the threshold value.

3. The system of claim 1, wherein the transformed sets of measurements are a first number of transformed sets of measurements, wherein the one or more memory devices further include instructions that are executable by the one or more processors for causing the one or more processors to:
  receive another set of measurements associated with the network-connected device;
  determine another Mahalanobis distance for the other set of measurements using the generalized inverse matrix; and
  in response to determining that the other Mahalanobis distance meets or exceeds the threshold value:
    generate a second number of transformed sets of measurements by using the orthogonal array to transform the other set of measurements, wherein at least one measurement of the other set of measurements is excluded from each of the second number of transformed sets of measurements;
    determine another set of transformed Mahalanobis distances for the second number of transformed sets of measurements;
    for each attribute among the plurality of attributes of the network-connected device:
      select a first subset of transformed Mahalanobis distances, from among the set of transformed Mahalanobis distances and the other set of transformed Mahalanobis distances, corresponding to transformed sets of measurements in which the attribute is present;
      determine a first accuracy value indicating a first level of accuracy of the first subset of transformed Mahalanobis distances;
      select a second subset of transformed Mahalanobis distances, from among the set of transformed Mahalanobis distances and the other set of transformed Mahalanobis distances, corresponding to transformed sets of measurements in which the attribute is excluded; and
      determine a second accuracy value indicating a second level of accuracy of the second subset of transformed Mahalanobis distances; and
    determine the importance score for each attribute using a difference between the first accuracy value and the second accuracy value computed for the attribute.

4. The system of claim 1, wherein the one or more memory devices further include instructions that are executable by the one or more processors for causing the one or more processors to,
  automatically determine a type of the abnormal condition based on a measurement of the set of measurements corresponding to the attribute with the highest importance score; and
  in response to determining the type of the abnormal condition, transmit one or more electronic signals over a network to a control system associated with the network-connected device, the control system being configured to receive the one or more electronic signals and responsively execute a mitigation operation for mitigating the abnormal condition.

5. The system of claim 1, wherein the one or more memory devices further include instructions that are executable by the one or more processors for causing the one or more processors to, prior to receiving the set of measurements:
  receive baseline measurements associated with the network-connected device, the baseline measurements being obtained from the plurality of sensors during normal operations of the network-connected device corresponding to the plurality of attributes of the network-connected device;
  determine a plurality of correlation coefficients indicating levels of correlation between the baseline measurements by using a minimum covariance determinant (MCD) algorithm;
  generate a correlation matrix based on the plurality of correlation coefficients;
  determine the generalized inverse matrix for the correlation matrix using a sweep function; and
  create the multidimensional space using the generalized inverse matrix, a vector of means for the baseline measurements, and a vector of standard deviations for the baseline measurements.

6. The system of claim 5, wherein the one or more memory devices further include instructions that are executable by the one or more processors for causing the one or more processors to:
  determine a baseline set of Mahalanobis distances for the baseline measurements based on the generalized inverse matrix; and
  determine the threshold value based on the baseline set of Mahalanobis distances for the multidimensional space.

7. The system of claim 5, wherein the one or more memory devices further include instructions that are executable by the one or more processors for causing the one or more processors to, prior to determining the plurality of correlation coefficients between measurements using the MCD algorithm:
  identify outlier measurements in the baseline measurements using a multivariate outlier detection algorithm; and
  remove the outlier measurements from the baseline measurements.

8. The system of claim 7, wherein the multivariate outlier detection algorithm is a Support Vector Data Description algorithm.

9. The system of claim 5, wherein the one or more memory devices further include instructions that are executable by the one or more processors for causing the one or more processors to:
  classify the baseline measurements into measurement clusters by using a k-means algorithm and maximizing a Pseudo-F statistic;
  determine cluster correlation matrices for the measurement clusters;
  determine generalized inverse matrices for the cluster correlation matrices;
  create a plurality of multidimensional spaces using the generalized inverse matrices, vectors of means for the measurement clusters, and vectors of standard deviations for the measurements clusters;

determine a plurality of baseline sets of Mahalanobis distances for the measurement clusters, each baseline set of Mahalanobis distances in the plurality of baseline sets of Mahalanobis distances corresponding to a respective cluster among the measurement clusters; and determine a plurality of abnormality thresholds based on the plurality of baseline sets of Mahalanobis distances for the plurality of multidimensional spaces, wherein each abnormality threshold of the plurality of abnormality thresholds corresponds to a respective multidimensional space of the plurality of multidimensional spaces and is usable for detecting a respective abnormal condition in the network-connected device.

10. The system of claim 5, wherein the one or more memory devices further include instructions that are executable by the one or more processors for causing the one or more processors to:

group a plurality of attributes into a plurality of attribute groups using a factor analysis technique;

determine proxy attributes corresponding to the plurality of attribute groups by selecting one attribute from each attribute group to serve a proxy attribute representing the attribute group;

determine correlation coefficients based on a subset of the baseline measurements corresponding to the proxy attributes, wherein a remainder of the baseline measurements corresponding to a remainder of the plurality of attributes is excluded in determining the correlation coefficients; and generate the correlation matrix using the correlation coefficients.

11. The system of claim 10, wherein the factor analysis technique comprises applying oblique rotations to the baseline measurements.

12. A method, comprising:

receiving, by one or more processors, a set of measurements from a plurality of sensors associated with a network-connected device, the set of measurements corresponding to a plurality of attributes of the network-connected device;

determining, by the one or more processors, a Mahalanobis distance for the set of measurements using a generalized inverse matrix, wherein the Mahalanobis distance is a distance between the set of measurements and a centroid of a multidimensional space, wherein the multidimensional space is based on the generalized inverse matrix;

generating, by the one or more processors, an orthogonal array based on how many measurements are in the set of measurements;

comparing, by the one or more processors, the Mahalanobis distance to a threshold value associated with an abnormal condition of the network-connected device; and in response to determining that the Mahalanobis distance meets or exceeds the threshold value, determining, by the one or more processors, an attribute responsible for the abnormal condition of the network-connected device by:

generating transformed sets of measurements by using the orthogonal array to transform the set of measurements, wherein at least one measurement of the set of measurements is excluded from each of the transformed sets of measurements;

determining transformed Mahalanobis distances for the transformed sets of measurements using the generalized inverse matrix;

determining an importance score for each attribute of the plurality of attributes of the network-connected device based on differences between (i) an average of transformed Mahalanobis distances in which measurements for the attribute are present and (ii) another average of transformed Mahalanobis distances in which measurements for the attribute are excluded; and selecting one of the plurality of attributes that corresponds to a highest importance score as the attribute responsible for the abnormal condition;

generating, by the one or more processors, a notification indicating the abnormal condition and the attribute responsible for the abnormal condition; and transmitting, by the one or more processors, the notification to a user device of a user associated with the network-connected device.

13. The method of claim 12, further comprising:

receiving another set of measurements associated with the network-connected device;

determining another Mahalanobis distance for the other set of measurements using the generalized inverse matrix; and in response to determining that the other Mahalanobis distance meets or exceeds the threshold value:

generating a second number of transformed sets of measurements by using the orthogonal array to transform the other set of measurements, wherein at least one measurement of the other set of measurements is excluded from each of the second number of transformed sets of measurements;

determining another set of transformed Mahalanobis distances for the second number of transformed sets of measurements;

for each attribute among the plurality of attributes of the network-connected device:

selecting a first subset of transformed Mahalanobis distances, from among the set of transformed Mahalanobis distances and the other set of transformed Mahalanobis distances, corresponding to transformed sets of measurements in which the attribute is present;

determining a first accuracy value indicating a first level of accuracy of the first subset of transformed Mahalanobis distances;

selecting a second subset of transformed Mahalanobis distances, from among the set of transformed Mahalanobis distances and the other set of transformed Mahalanobis distances, corresponding to transformed sets of measurements in which the attribute is excluded; and determining a second accuracy value indicating a second level of accuracy of the second subset of transformed Mahalanobis distances; and determining the importance score for each attribute using a difference between the first accuracy value and the second accuracy value computed for the attribute.

14. The method of claim 12, further comprising:

automatically determining a type of the abnormal condition based on a measurement of the set of measurements corresponding to the attribute with the highest importance score; and in response to determining the type of the abnormal condition, transmitting one or more electronic signals over a network to a control system associated with the network-connected device, the control system being configured to receive the one or more electronic signals and responsively execute a mitigation operation for mitigating the abnormal condition.

15. The method of claim 12, further comprising, prior to receiving the set of measurements:
    receiving baseline measurements associated with the network-connected device, the baseline measurements being obtained from the plurality of sensors during normal operations of the network-connected device corresponding to the plurality of attributes of the network-connected device;
    determining a plurality of correlation coefficients indicating levels of correlation between the baseline measurements by using a minimum covariance determinant (MCD) algorithm;
    generating a correlation matrix based on the plurality of correlation coefficients;
    determining the generalized inverse matrix for the correlation matrix using a sweep function; and
    creating the multidimensional space using the generalized inverse matrix, a vector of means for the baseline measurements, and a vector of standard deviations for the baseline measurements.

16. The method of claim 15, further comprising:
    determining a baseline set of Mahalanobis distances for the baseline measurements based on the generalized inverse matrix; and
    determining the threshold value based on the baseline set of Mahalanobis distances for the multidimensional space.

17. The method of claim 15, further comprising, prior to determining the plurality of correlation coefficients between measurements using the MCD algorithm:
    identifying outlier measurements in the baseline measurements using a multivariate outlier detection algorithm; and
    removing the outlier measurements from the baseline measurements.

18. The method of claim 17, wherein the multivariate outlier detection algorithm is a Support Vector Data Description algorithm.

19. The method of claim 15, further comprising:
    classifying the baseline measurements into measurement clusters by using a k-means algorithm and maximizing a Pseudo-F statistic;
    determining cluster correlation matrices for the measurement clusters;
    determining generalized inverse matrices for the cluster correlation matrices;
    creating a plurality of multidimensional spaces using the generalized inverse matrices, vectors of means for the measurement clusters, and vectors of standard deviations for the measurements clusters;
    determining a plurality of baseline sets of Mahalanobis distances for the measurement clusters, each baseline set of Mahalanobis distances in the plurality of baseline sets of Mahalanobis distances corresponding to a respective cluster among the measurement clusters; and
    determining a plurality of abnormality thresholds based on the plurality of baseline sets of Mahalanobis distances for the plurality of multidimensional spaces, wherein each abnormality threshold of the plurality of abnormality thresholds corresponds to a respective multidimensional space of the plurality of multidimensional spaces and is usable for detecting a respective abnormal condition in the network-connected device.

20. The method of claim 15, further comprising:
    grouping a plurality of attributes into a plurality of attribute groups using a factor analysis technique;
    determining proxy attributes corresponding to the plurality of attribute groups by selecting one attribute from each attribute group to serve a proxy attribute representing the attribute group;
    determining correlation coefficients based on a subset of the baseline measurements corresponding to the proxy attributes, wherein a remainder of the baseline measurements corresponding to a remainder of the plurality of attributes is excluded in determining the correlation coefficients; and
    generating the correlation matrix using the correlation coefficients.

21. The method of claim 20, wherein the factor analysis technique comprises applying oblique rotations to the baseline measurements.

22. A non-transitory computer-readable medium comprising program code that is executable by one or more processors for causing the one or more processors to:
    receive a set of measurements from a plurality of sensors associated with a network-connected device, the set of measurements corresponding to a plurality of attributes of the network-connected device;
    determine a Mahalanobis distance for the set of measurements using a generalized inverse matrix, wherein the Mahalanobis distance is a distance between the set of measurements and a centroid of a multidimensional space, wherein the multidimensional space is based on the generalized inverse matrix;
    generate an orthogonal array based on how many measurements are in the set of measurements;
    compare the Mahalanobis distance to a threshold value associated with an abnormal condition of the network-connected device; and
    in response to determining that the Mahalanobis distance meets or exceeds the threshold value, determine an attribute responsible for the abnormal condition of the network-connected device by:
        generating transformed sets of measurements by using the orthogonal array to transform the set of measurements, wherein at least one measurement of the set of measurements is excluded from each of the transformed sets of measurements;
        determining transformed Mahalanobis distances for the transformed sets of measurements using the generalized inverse matrix;
        determining an importance score for each attribute of the plurality of attributes of the network-connected device based on differences between (i) an average of transformed Mahalanobis distances in which measurements for the attribute are present and (ii) another average of transformed Mahalanobis distances in which measurements for the attribute are excluded; and
        selecting one of the plurality of attributes that corresponds to a highest importance score as the attribute responsible for the abnormal condition;
    generate a notification indicating the abnormal condition and the attribute responsible for the abnormal condition; and
    transmit the notification to a user device of a user associated with the network-connected device.

23. The non-transitory computer-readable medium of claim 22, further comprising program code that is executable by one or more processors for causing the one or more processors to:
receive another set of measurements associated with the network-connected device;
determine another Mahalanobis distance for the other set of measurements using the generalized inverse matrix; and
in response to determining that the other Mahalanobis distance meets or exceeds the threshold value:
generate a second number of transformed sets of measurements by using the orthogonal array to transform the other set of measurements, wherein at least one measurement of the other set of measurements is excluded from each of the second number of transformed sets of measurements;
determine another set of transformed Mahalanobis distances for the second number of transformed sets of measurements;
for each attribute among the plurality of attributes of the network-connected device:
select a first subset of transformed Mahalanobis distances, from among the set of transformed Mahalanobis distances and the other set of transformed Mahalanobis distances, corresponding to transformed sets of measurements in which the attribute is present;
determine a first accuracy value indicating a first level of accuracy of the first subset of transformed Mahalanobis distances;
select a second subset of transformed Mahalanobis distances, from among the set of transformed Mahalanobis distances and the other set of transformed Mahalanobis distances, corresponding to transformed sets of measurements in which the attribute is excluded; and
determine a second accuracy value indicating a second level of accuracy of the second subset of transformed Mahalanobis distances; and
determine the importance score for each attribute using a difference between the first accuracy value and the second accuracy value computed for the attribute.

24. The non-transitory computer-readable medium of claim 22, further comprising program code that is executable by one or more processors for causing the one or more processors to:
automatically determine a type of the abnormal condition based on a measurement of the set of measurements corresponding to the attribute with the highest importance score; and
in response to determining the type of the abnormal condition, transmit one or more electronic signals over a network to a control system associated with the network-connected device, the control system being configured to receive the one or more electronic signals and responsively execute a mitigation operation for mitigating the abnormal condition.

25. The non-transitory computer-readable medium of claim 22, further comprising program code that is executable by one or more processors for causing the one or more processors to:
prior to receiving the set of measurements,
receive baseline measurements associated with the network-connected device, the baseline measurements being obtained from the plurality of sensors during normal operations of the network-connected device corresponding to the plurality of attributes of the network-connected device;
determine a plurality of correlation coefficients indicating levels of correlation between the baseline measurements by using a minimum covariance determinant (MCD) algorithm;
generate a correlation matrix based on the plurality of correlation coefficients;
determine the generalized inverse matrix for the correlation matrix using a sweep function; and
create the multidimensional space using the generalized inverse matrix, a vector of means for the baseline measurements, and a vector of standard deviations for the baseline measurements.

26. The non-transitory computer-readable medium of claim 22, further comprising program code that is executable by one or more processors for causing the one or more processors to, prior to determining the plurality of correlation coefficients between measurements using the MCD algorithm:
identify outlier measurements in the baseline measurements using a multivariate outlier detection algorithm comprising a Support Vector Data Description algorithm; and
remove the outlier measurements from the baseline measurements.

27. The non-transitory computer-readable medium of claim 22, further comprising program code that is executable by one or more processors for causing the one or more processors to:
classify the baseline measurements into measurement clusters by using a k-means algorithm and maximizing a Pseudo-F statistic;
determine cluster correlation matrices for the measurement clusters;
determine generalized inverse matrices for the cluster correlation matrices;
create a plurality of multidimensional spaces using the generalized inverse matrices, vectors of means for the measurement clusters, and vectors of standard deviations for the measurements clusters;
determine a plurality of baseline sets of Mahalanobis distances for the measurement clusters, each baseline set of Mahalanobis distances in the plurality of baseline sets of Mahalanobis distances corresponding to a respective cluster among the measurement clusters; and
determine a plurality of abnormality thresholds based on the plurality of baseline sets of Mahalanobis distances for the plurality of multidimensional spaces, wherein each abnormality threshold of the plurality of abnormality thresholds corresponds to a respective multidimensional space of the plurality of multidimensional spaces and is usable for detecting a respective abnormal condition in the network-connected device.

28. The non-transitory computer-readable medium of claim 22, further comprising program code that is executable by one or more processors for causing the one or more processors to:
group a plurality of attributes into a plurality of attribute groups using a factor analysis technique;
determine proxy attributes corresponding to the plurality of attribute groups by selecting one attribute from each attribute group to serve a proxy attribute representing the attribute group;
determine correlation coefficients based on a subset of the baseline measurements corresponding to the proxy attributes, wherein a remainder of the baseline measurements corresponding to a remainder of the plurality of attributes is excluded in determining the correlation coefficients; and generate the correlation matrix using the correlation coefficients.

* * * * *